(12) United States Patent
Shalvi et al.

(10) Patent No.: US 6,751,269 B1
(45) Date of Patent: Jun. 15, 2004

(54) BIT-INTERLEAVED CODED MODULATION FOR CATV UPSTREAM CHANNELS

(75) Inventors: Ofir Shalvi, Herzlia (IL); Itay Lusky, Tel Aviv (IL); Zvi Reznic, Tel Aviv (IL); Daniel Wajcer, Netanya (IL); Ariel Yagil, Ramat Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/480,418

(22) Filed: Jan. 11, 2000

Related U.S. Application Data
(60) Provisional application No. 60/115,514, filed on Jan. 11, 1999.

(51) Int. Cl.$^7$ ................................................ H04L 27/36
(52) U.S. Cl. ...................................................... 375/298
(58) Field of Search .................................. 375/298, 261, 375/265, 295; 714/794, 790, 791

(56) References Cited

U.S. PATENT DOCUMENTS

| | | | | |
|---|---|---|---|---|
| 5,790,570 A | * | 8/1998 | Heegard et al. | 714/755 |
| 5,812,601 A | * | 9/1998 | Schramm | 375/262 |
| 6,282,168 B1 | * | 8/2001 | Vijayan et al. | 370/203 |
| 6,574,767 B2 | * | 6/2003 | Eroz et al. | 714/755 |

* cited by examiner

*Primary Examiner*—Khai Tran
(74) *Attorney, Agent, or Firm*—Wade James Brady, III; Frederick J. Telecky, Jr.

(57) ABSTRACT

A bit-interleaved encoder for a CATV upstream channel is provided having a convolutional encoder for receiving data values, a bit-interleaver interconnected with said encoder, and a symbol mapper interconnected with said bit-interleaver.

3 Claims, 1 Drawing Sheet

BIT-INTERLEAVED CODED MODULATION FOR CATV UPSTREAM CHANNELS

This application claims priority under 35 USC § 119(e)(1) of Provisional application Ser. No. 60/115,514, filed Jan. 11, 1999. Additionally, this application is related to the following copending and commonly assigned application Ser. No.09/481,317 entitled "GUARD CODES FOR S-CDMA SYSTEMS", filed Jan. 11, 2000; and application Ser. No. 09/481,302 entitled "HIGH-POWER PREAMBLE FOR PACKET NETWORK", filed Jan. 11, 2000.

TECHNICAL FIELD OF THE INVENTION

The present invention relates to Bit-Interleaved Coded Modulation (BICM) for CATV upstream channels.

BACKGROUND OF THE INVENTION

Upstream CATV channel suffer from a hostile environment that includes various impairments. Such impairments include additive Gaussian white noise (AWGN), impulse noise, bust noise, narrowband noise (ingress) and others. The present invention provides a coding scheme that is robust to these impairments, especially impulse noise and AWGN. The complexity of the encoder of this method is relatively low, which makes it ideal for multi-point to-point channels, such as the CATV upstream channel.

SUMMARY OF THE INVENTION

The present invention is a coding scheme that includes a convolutional encoder, bit-interleaver and symbol mapper. The parameters of these units are determined as a trade off between data throughput and system robustness, according to the channel conditions. The circuitry to build the encoder are low cost and widely used. Simulations have shown that the provided method is very efficient for CATV upstream channels in many typical scenarios, including AWGN, impulse noise, burst noise and combinations of these channel impairments.

BRIEF DESCRIPTION OF THE DRAWINGS

For a more complete understanding of the present invention, and the advantages thereof, reference is now made to the following detailed description taken in conjunction with the accompanying drawings, in which.

DETAILED DESCRIPTION

The invention provides an efficient coding scheme for upstream CATV channels. The provided coding scheme is Bit-Interleaved Coded Modulation (BICM). BICM provides high robustness against Additive White Gaussian Noise (AWGN), impulse noise and burst noise which are typical impairments of the CATV upstream channel. In prior art (Zehavi E., 8-PSK Trellis Codes for a Rayleigh Channel, IEEE Transactions on Communications, vol. 40, no. 5, 1992, 873–884), (Caire G., Taricco G., Biglieri E., Bit-Interleaved Coded Modulation, IEEE Transactions on Information Theory, vol. 44, no. 3, 1998, pp. 927–946), BICM is proposed and analyzed for Rayleigh fading channel. In this invention, BICM is employed for CATV channels, and other similar noisy data channels.

Figure 1:
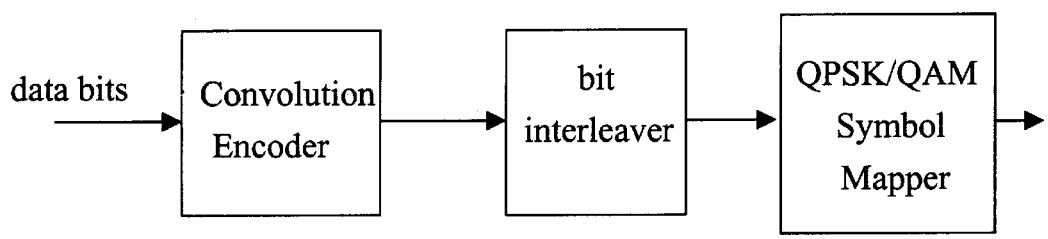
FIG. 1 shows the general structure of BICM encoder of the present invention.

The structure of BICM encoder of the present invention is shown in FIG. 1.

The encoder of the present invention consists of a convolutional encoder, a bit-interleaver and symbol mapper (preferably a Gray or quasi-gray coded mapper).

Binary Convolutional Encoder

Convolutional encoders have been widely used in communication systems for many years. The parameters of the encoder (coding rate, constraint length, etc.) are determined by the desired data rate and the channel conditions. The input bits to the encoder are called "data bits". The output bits from the encoder are called "channel bits". For rate k/n encoders (k 1), the convolutional encoder may consist of a 1/n convolutional encoder (such as ½ or ⅓) and a puncturing unit. The puncturing unit is a unit that deletes some of the bits in the 1/n convolutional encoder in an a-priori known pattern (see example below). In this way, high rate codes can be easily derived from a single rate 1/n encoder. The number of output bits in one puncturing pattern is called puncturing cycle.

Figure 2:
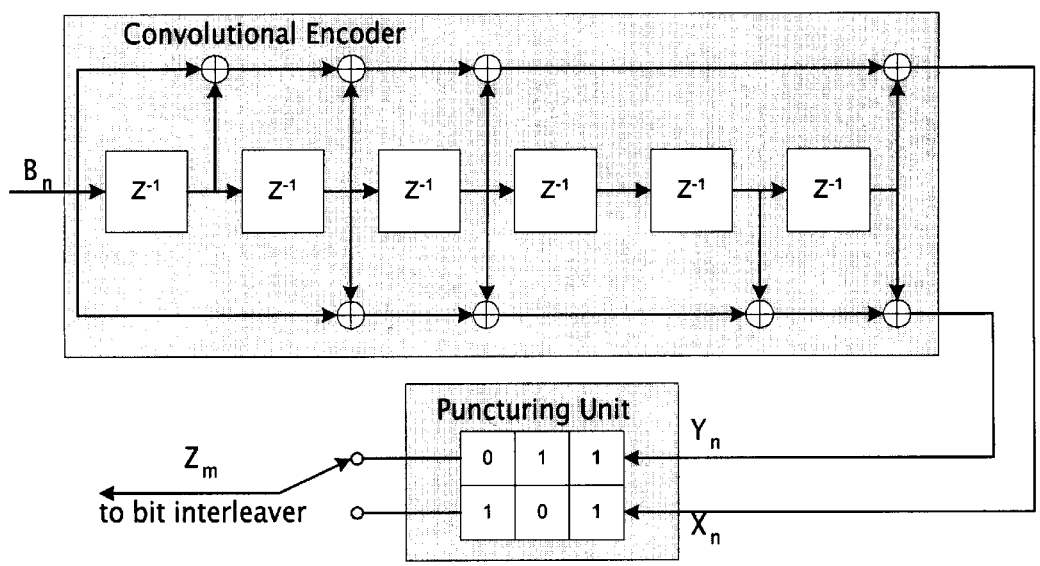
FIG. 2 shows an example of rate ¾ convolutional encoder, which consists of a rate ½ convolutional encoder and a puncturing unit.

Example: rate ½ convolutional encoder with generating polynomials octal 171,133 (see FIG. 2), also known as NASA code or de-facto code is used with a puncturing unit. This code is very widely used and known for good performance with various puncturing schemes (see Yasuda Y., Kashiki K., Hirata Y., High Rate Punctured Convolutional Codes for Soft-Decision Viterbi Decoding, IEEE Transactions on Communications, vol. 32, no. 3, 1984, pp. 315–319). This allows high flexibility and good trade-off between data throughput and robustness. This encoder with rate ¾ puncturing unit is shown in FIG. 2. The puncturing cycle of this puncturing unit is 4.

Bit-interleaver

The bit-interleaver is a unit that performs bit permutations; i.e. it changes the order of the bits in its input in an a-priori known pattern. A common interleaver is the block interleaver. In block interleaver the permutation is implemented by writing the bits into the table row-wise and reading them column-wise. The size of the interleaver is a trade-off between performance and latency/memory resources (A larger interleaver has better performance but requires more memory resources and imposes longer latency). Simulations have shown that when block interleaver is used: a) The number of columns (width) should be chosen such that it is not an integer multiple of the puncturing cycle, b) The number of rows (depth) should be chosen such that it is not an integer multiple of channel bits per symbol.

QPSK/QAM Symbol Mapper

The output bit sequence of the bit-interleaver is parsed into k-tuples of bits. The symbol mapper translates each k-tuple to a symbol (chosen from $2^k$ constellation symbols) in the complex domain (k is the number of channel bits per symbol). The k-tuple is called he label of the constellation point. The Hamming distance between labels symbol pairs with minimal Edclidean distance should be minimized. In other words, Gray coding should be used when feasible. Otherwise "quasi-Gray" coding (i.e. coding scheme that minimizes the Hamming distances between neighboring points) should be used.

An appendix is attached that is a draft specification that includes a representative implementation of the BICM encoder of the present invention. Appendix: IEEE802.14a High-Capacity Physical Layer Specifications, Draft 1, rev. 4 (this specification includes representative implementation of the BICM encoder of the present invention)

APPENDIX

*High-Capacity Physical Layer Specification*  *IEEE 802.14a*
*Draft 1 Revision 4*

4 Physical Media Dependent Sublayer Specification

4.1 Scope

This specification defines the electrical characteristics and protocol for a cable modem (CM) and cable modem termination system (CMTS). It is the intent of this specification to define an interoperable CM and CMTS such that any implementation of a CM can work with any CMTS. It is not the intent of this specification to imply any specific implementation.

4.2 Upstream

4.2.1 Overview

The upstream Physical Media Dependent (PMD) sublayer employs burst modulation formats for synchronous and non-synchronous Time Division Multiple Access (TDMA) and Synchronous-Code Division Multiple Access (S-CDMA) transmission. Six signaling rates (160, 320, 640, 1280, 2560, 5120 ksym/sec) are defined. For each signaling rate, either uncoded modulation with m = 2 to 6 information bits per symbol, or Trellis-Coded Modulation (TCM) with m = 1 to 6 bits per symbol, or Bit Interleaved Coded Modulation (BICM) with m = 1 to 6 bits per symbol is defined. Parameters for Reed-Solomon Forward Error Correction (R-S FEC) encoding, R-S codeword interleaving, modulation encoding, preamble content and length, and intra-packet symbol interleaving can be chosen in a wide range. The modulation function includes pulse-shaping filtering, is frequency agile, and has selectable output level.

The current working group decisions reflect that TDMA is mandatory in the CM and that S-CDMA is optional in the CM and CMTS.

Upstream transmission can occur simultaneously in a multitude of Frequency Division Multiple Access (FDMA) channels. Each channel is primarily characterized by its signaling rate ($1/T_s$) and center frequency (fc). The bandwidth occupied by a channel is given by $(1+\alpha_{sf})/T_s$, where ($\alpha_{sf}$=0.25) is the spectral roll-off parameter.

The CMTS specifies for each FDMA channel either TDMA or S-CDMA transmission. The TDMA and S-CDMA modes are based on a common definition for encoding a packet of data bytes into a packet of modulation symbols. This process includes the processing steps of R-S FEC encoding, R-S codeword interleaving, randomization, uncoded modulation or TCM encoding/modulation or BICM encoding/modulation, preamble prepending and zero-symbol appending, and intra-packet symbol interleaving, where some of these steps are optional. The main difference between TDMA and S-CDMA consists in the conversion of modulation symbols into orthogonal waveforms. With TDMA, modulation symbols are transmitted serially, and modulation rate and signaling rate $1/T_s$ are the same. With S-CDMA, up to N = 128 modulation symbols are transmitted simultaneously at modulation rate ($1/N \times T_s$) by using N orthogonal spreading codes of length N x $T_s$. The signaling rate is $1/T_s$. Figure 4-1 illustrates the difference between TDMA and S-CDMA.

In Figure 4-1, modulation symbols are indexed sequentially for TDMA and column-wise sequentially for S-CDMA. This order is called the "channel-symbol order." It reflects the order in which symbols are naturally transmitted over the physical transmission channel.

Upstream transmission opportunities are requested by the CMs and granted by the CMTS in terms of one mini-slot or several contiguous mini-slots. A mini-slot represents a programmable number of symbol times. The mini-slot size is defined by a media access control (MAC) downstream message for a given FDMA channel, and remains in effect for all upstream transmissions on this channel until it may be redefined by another MAC message. Thus, in essence from the MAC perspective, a grant allocates a window of consecutive symbol times High-Capacity Physical Layer Specification  
Draft 1 Revision 4

IEEE 802.14a

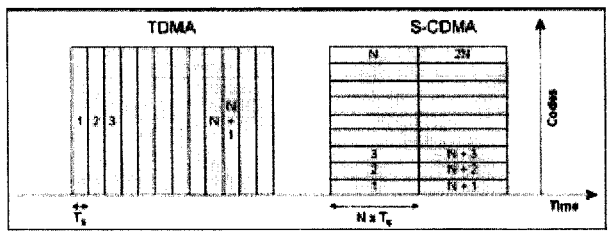

Figure 4-1 TDMA and S-CDMA with Natural Symbol-Index Order for upstream transmission. The consecutive symbol order perceived by the MAC is called "MAC-symbol order." The channel-symbol order and the MAC symbol order are not necessarily identical.

In the case of TDMA, CMs share a channel by sending blocks of symbols in burst mode during disjoint time intervals. Bursts from different CMs may arrive at the CMTS receiver with various degrees of inter-burst synchronicity, ranging from synchronous arrival with negligible timing errors to asynchronous arrivals. To accommodate these differences, the guard time between bursts shall be programmable from one symbol to several symbol times. Here, the guard time is defined as the time between the center of the last symbol of one burst and the center of the first symbol of the preamble of an immediately following burst (Section 4.2.3.2). In the TDMA mode, IEEE 802.14a CMs may be able to coexist with DOCSIS 1.0/1.1 CMs on the same upstream FDMA channel.

In the case of S-CDMA, channel sharing is based on a combination of burst mode transmission and use of different spreading codes for simultaneous transmission by different CMs. All symbols must arrive synchronously at the CMTS receiver.

All of the upstream transmission parameters associated with burst transmission outputs from the CM are configurable by the CMTS via MAC messaging. Many of the parameters are programmable on a burst-by-burst basis.

The upstream modulator is the part of the cable modem (CM) which interfaces with the cable network. The modulator contains the electrical-level modulation function and the digital signal-processing function. The CM provides the FEC, interleaving, preamble prepend, symbol mapping, and other processing steps. This specification assumes the buffering of bursts in the signal processing portion, with the signal processing portion (1) accepting the information stream a burst at a time, (2) processing the stream into a complete burst of symbols for the modulator, and (3) feeding the properly-timed bursted symbol stream to the modulator at the precise burst transmit time. The modulator performs pulse shaping and upconversion to a radio frequency (RF) signal.

At the demodulator, similar to the modulator, there are two basic functional components: the demodulation function and the signal processing function. The demodulator resides in the CMTS and the specification is written with the concept that there will be one demodulation function (not necessarily an actual physical demodulator) for each carrier frequency in use. The demodulation function receives all bursts on a given frequency.

The demodulation function accepts a varying-level signal centered around a commanded power level. It performs burst acquisition, symbol timing recovery, carrier recovery, and demodulation. Additionally, the demodulation function provides an estimate of burst timing relative to a reference edge, an estimate of received signal power, an estimate of signal-to-noise ratio, performs FEC decoding and/or deinterleaving to mitigate the effects of impulse/burst noise, and performs adaptive equalization to mitigate the effects of a) echoes in the cable plant, b) narrowband ingress and c) group delay. The signal-processing function of the demodulator performs the

*High-Capacity Physical Layer Specification*  
*Draft 1 Revision 4*           *IEEE 802.14a* inverse processing of the signal-processing function of the modulator. This includes accepting the demodulated burst data stream and decoding, and possibly multiplexing the data from multiple channels into a single output stream. The signal-processing function provides a timing reference to the demodulator to activate the burst acquisition for each assigned burst. The signal-processing function may also provide an indication of successful decoding. For every upstream burst, the CMTS has prior knowledge of the exact burst length in symbols.

4.2.2 Signal Processing Requirements

For DOCSIS 1.0 and DOCSIS 1.1 systems, the signal processing order SHALL follow the sequences in Figure 4-2 and Figure 4-3.

For IEEE 802.14a systems, the signal processing SHALL follow the sequences shown in Figure 4-4 through Figure 4-7.

For IEEE 802.14a systems, S-CDMA mode SHALL be enabled or disabled globally in a given FDMA channel by command of the CMTS.

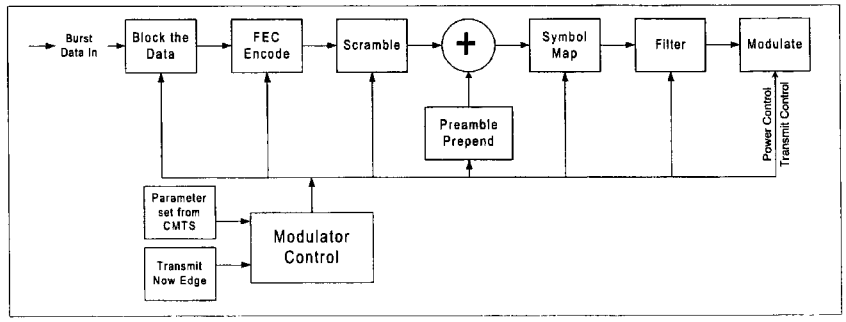

Figure 4-2 DOCSIS 1.0/1.1 Upstream Transmission Processing

*High-Capacity Physical Layer Specification*  
*Draft 1 Revision 4*  
*IEEE 802.14a*
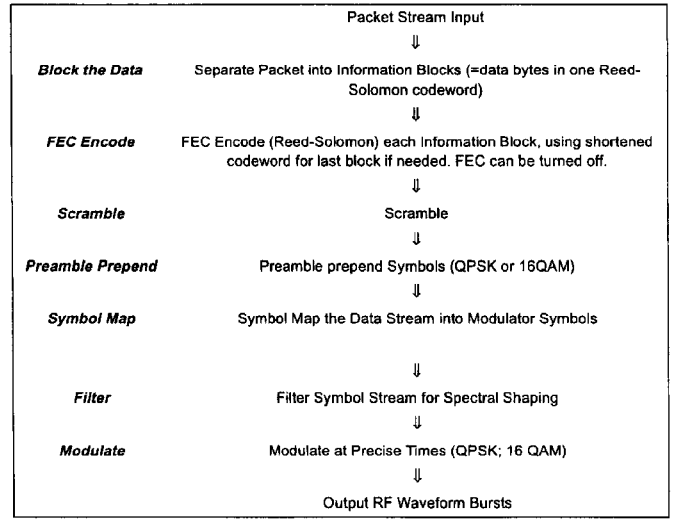
Figure 4-3 DOCSIS 1.0/1.1 Signal Processing Sequence
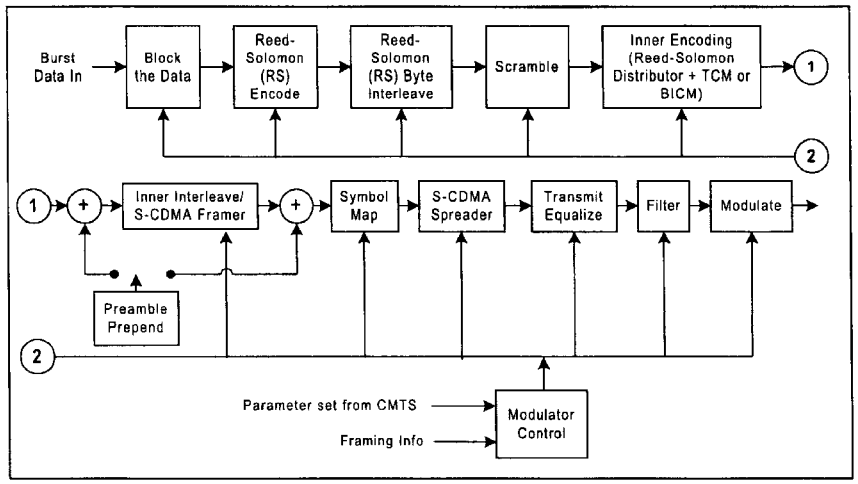
Figure 4-4 IEEE 802.14a Upstream Transmission Processing

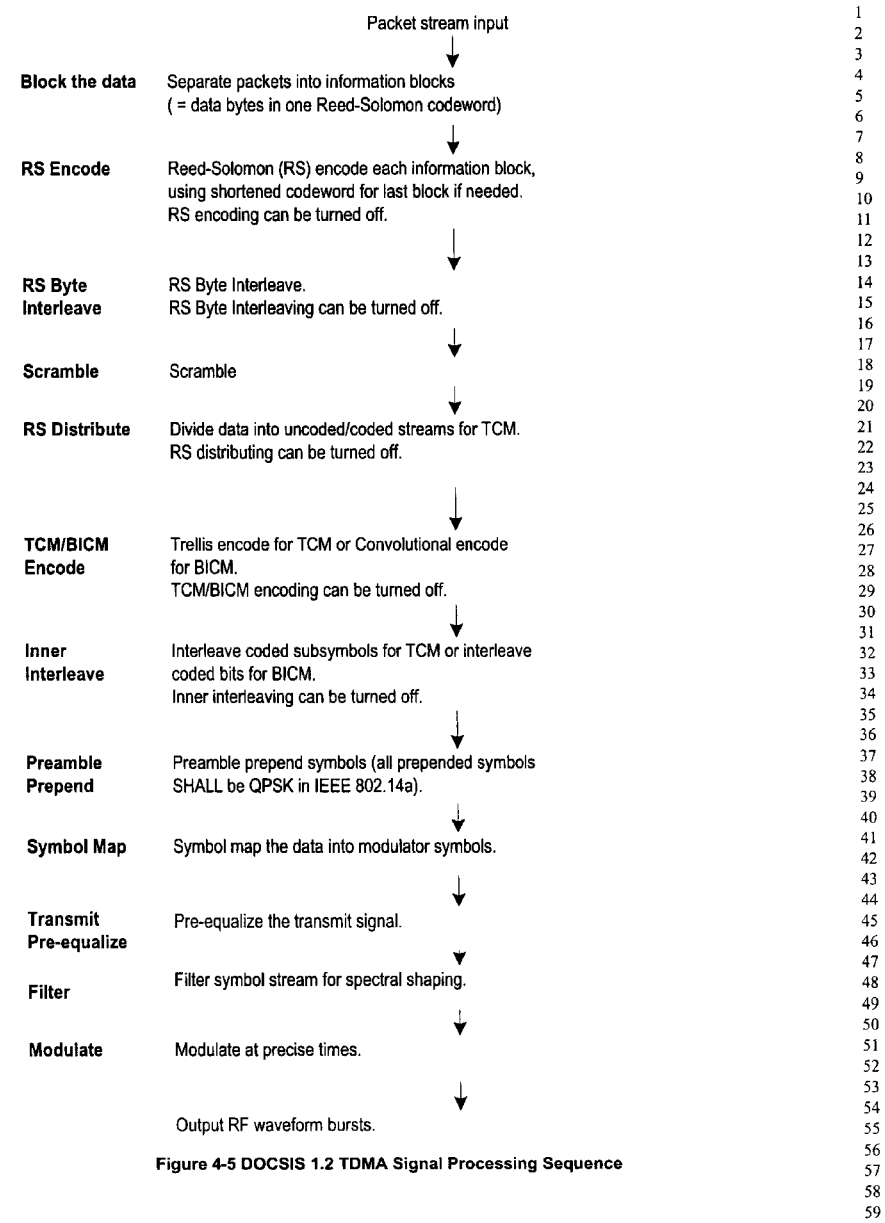
Figure 4-5 DOCSIS 1.2 TDMA Signal Processing Sequence

*High-Capacity Physical Layer Specification*  
*Draft 1 Revision 4*  
*IEEE 802.14a*
For synchronous TDMA mode, the order of preamble prepend and TCM symbol interleave may be interchanged.
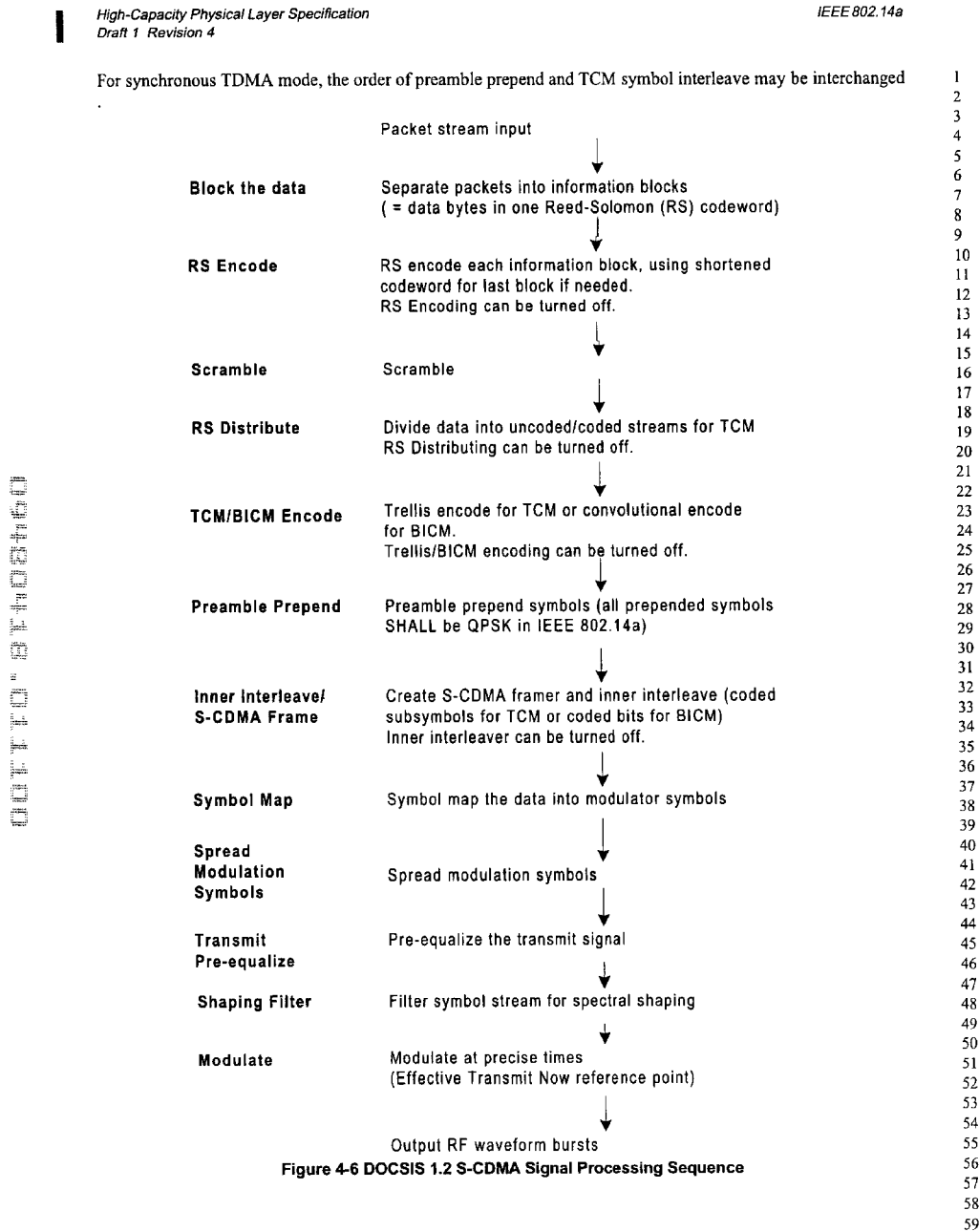
Figure 4-6 DOCSIS 1.2 S-CDMA Signal Processing Sequence High-Capacity Physical Layer Specification  
Draft 1 Revision 4  
IEEE 802.14a

4.2.3 Frame Structures

4.2.3.1 Burst Frame Format

An example burst frame format is shown in Figure 4-7. Each burst contains Physical Layer (PHY) overhead which may include a preamble sequence that can comprise a unique word (UW) and/or an optional random sequence for equalizer training. When the TCM mode is enabled, tail symbols are required to terminate the TCM encoded packet in the zero state. Each packet should also include a guard time to compensate for ranging errors and ramp up/down time. For Synchronous TDMA or S-CDMA mode, however, the guard time can be the minimum of one symbol (no inter-burst gap). The preamble is constrained to be Quadrature Phase-Shift Keying (QPSK) in IEEE 802.14a channels.

| Preamble | Payload -- Variable Size (QPSK, 8QAM, 16QAM, 32QAM, 64QAM, 128QAM-TCM) | Tail (TCM Only) | Guard Time |
|---|---|---|---|

Figure 4-7 Example Burst Frame Format (with no interleaving)

4.2.3.2 TDMA Frame Timing

Figure 4-8 illustrates the arrival of two upstream frames at the CMTS receiver. The continuous-time symbol responses extend over time and generally interfere with each other. After matched filtering and equalization, the symbol responses should exhibit raised-cosine shapes (with spectral roll-off factor $\alpha = 0.25$), so that intersymbol interference (ISI) among the synchronous signals of the same frame vanishes at the sampling instants.

The time periods during which significant precursor and postcursor signals of a frame occur are referred to as ramp-up and ramp-down times, respectively. Guard time G is defined as the spacing between the center of the last symbol of a frame and the center of the first symbol in the next frame. The difference between the timing phases of the symbol responses of consecutive frames is denoted by $\Delta\tau_s$. To prevent ISI between the last symbols of one frame and the first symbols of the next frame, when $\Delta\tau_s \neq 0$, a minimum guard time $G_{min}$ must be maintained.

The CMTS decides on the required value of $G_{min}$ and schedules upstream transmissions accordingly. The choice of $G_{min}$ depends on the degree of achievable synchronism and the type of modulation employed for upstream transmission. For quasi-synchronous operation according to IEEE 802.14a, the CMTS SHOULD choose $G_{min} = T_s$ after verifying that frames from all active CMs are received with sufficiently small values of $\Delta\tau_s$.

For DOCSIS 1.0/1.1 operation, the worst-case timing-phase difference can be $\Delta\tau_s = \pm T_s/2$. In this case, a minimal guard time of $G_{min} = 5T_s$ SHALL be maintained at the CMTS receiver. Deviations of the actual arrival times of frames at the CMTS receiver from scheduled nominal times SHALL be taken into account. For example, assume imperfections in the ranging process can cause actual arrival times to deviate from scheduled nominal times by up to $\pm 1.5\ T_s$. Then, the CMTS would schedule upstream transmissions with a larger minimum guard time of $G'_{min} = 8T_s$, so that in the worst case the actual guard time at the CMTS receiver would meet the requirement of $G \geq G'_{min} - 2 \times 1.5\ T_s = 5T_s$.

Copyright © 1999 IEEE. All rights reserved.  
This is an unapproved IEEE Standards Draft, subject to change.  
TI-30301

High-Capacity Physical Layer Specification  
Draft 1 Revision 4

IEEE 802.14a

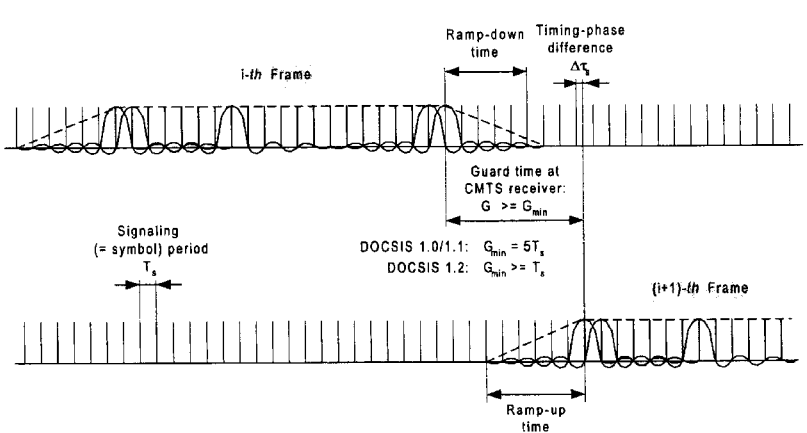

Figure 4-8 TDMA Frame Timing

4.2.3.3 S-CDMA Frame Structure

4.2.3.3.1 S-CDMA Framing Considerations

The S-CDMA mode of the PHY layer accepts data presented to it for transmission from the MAC layer. This data is presented as bursts of $n$ mini-slots. These bursts are mapped within the PHY layer to a combination of spreading codes and time slots, in order to exploit the multi-dimensional spreading of information by the S-CDMA mode.

There are various adjustable parameters in the upstream channel parameters and upstream burst attributes that allow controlling the mini-slot to physical layer mapping, as well as tuning the channel to accommodate a variety of channel conditions, noise characteristics, capacities, reliability levels, and latency requirements.

When operating in S-CDMA mode, data is transmitted in two dimensions: codes and time. For this reason, data to be transmitted must be grouped into two-dimensional rectangular frames prior to transmission.

At the physical layer, data is sent over an array of 128 spreading codes. There is a programmable number of *spreading intervals* per frame, as shown in Figure 4-9 below. A *spreading interval* is the time required to transmit one symbol per code across all 128 codes in S-CDMA mode. Note that the specific codes which are used and the details of the spreading operation are described in detail in Section 4.2.12.2

High-Capacity Physical Layer Specification  
Draft 1 Revision 4

IEEE 802.14a

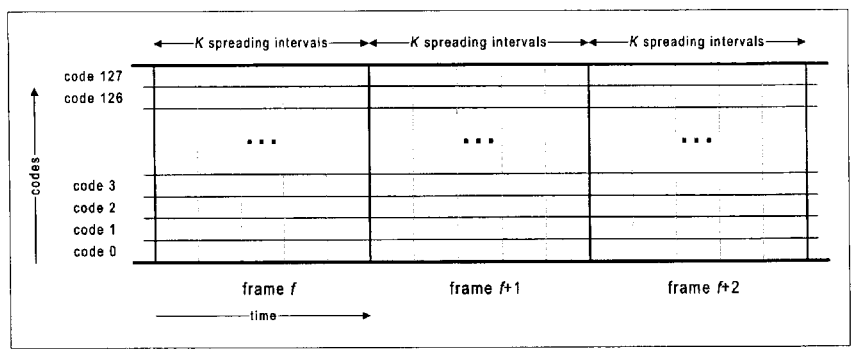

Figure 4-9 S-CDMA Frame Structure

A burst from a particular station may be transmitted on one or more codes in one or more frames. A frame may contain bursts transmitted simultaneously from multiple stations (each on a separate subset of the codes) as defined by the MAP message.

4.2.3.3.2 Mini-slot Numbering

In normal operation, the MAC will request the PHY to transmit a burst of length $n$ mini-slots, starting at mini-slot $m$, as defined by the MAP. All stations and the CMTS SHALL have a common protocol of how mini-slots are numbered, and how they are mapped onto the physical layer framing structure. This common protocol is obtained from information in the SYNC and Upstream Channel Descriptor (UCD) messages. (These messages are described in Section 6.3.2.)

Mini-slots are mapped onto frames starting at the first active code (usually code number 0), are numbered sequentially through the remainder of the frame (code number 127), and then wrap to the next sequential frame. Mini-slots are mapped onto a group of consecutive codes.

4.2.3.3.2.1 Mini-slot Numbering Examples

A typical mini-slot numbering example is shown in Figure 4-10. In this example, there are two codes per mini-slot defined. The number of codes per mini-slot is an adjustable parameter (via the UCD) to allow flexibility in determining the effective capacity of each mini-slot.

Copyright © 1999 IEEE. All rights reserved.  
This is an unapproved IEEE Standards Draft, subject to change.

TI-30301

*High-Capacity Physical Layer Specification*  
*Draft 1 Revision 4*  
*IEEE 802.14a*

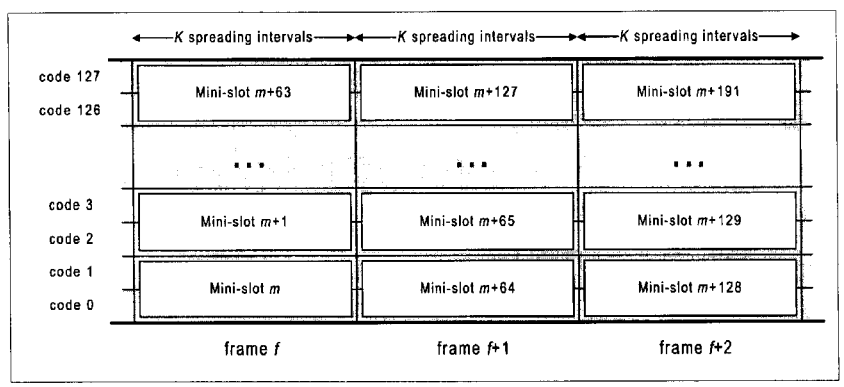

Figure 4-10 Mini-slot Mapping with Two Codes per Mini-slot, 128 Active Codes

A second example, using three codes per mini-slot, is shown in Figure 4-11. Since it is required that there be an integral number of mini-slots per frame, the number of active codes has been restricted to 126 codes. In this example, a trade-off has been made to increase mapping flexibility at the expense of a small reduction in channel capacity (2/128).

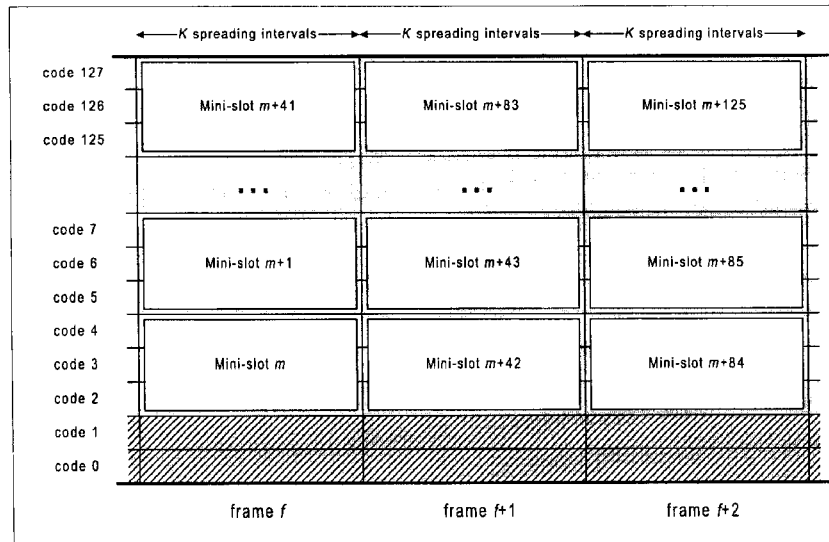

Figure 4-11 Mini-slot Mapping with Three Codes per Mini-slot, 126 Active Codes

High-Capacity Physical Layer Specification  
Draft 1 Revision 4  
IEEE 802.14a

There is no implication that physical layer processing is performed on a per mini-slot basis. As in DOCSIS 1.0/1.1, the physical layer is concerned only with the burst start time (mini-slot number) and the burst length.

4.2.3.3.2.2 Mini-slot Numbering Parameters in UCD

There are three parameters specified in the UCD that define mini-slot mapping: *spreading intervals per frame*, *codes per mini-slot*, and *number of active codes*.

*Spreading intervals per frame*

The number of spreading intervals per frame, K, (along with the signaling rate), $1/T_s$, define the time duration of an S-CDMA frame, $T_{fr}$.

$$T_{fr} = K * 128 * T_s \qquad (EQ\ 1)$$

Note that the code length in the above equation is always 128, regardless of how many codes are currently active.

The valid range of the *spreading intervals per frame* parameter is 1 to 32.

*Codes per mini-slot*

In conjunction with the spreading intervals per frame parameter, the codes per mini-slot ($C_{ms}$) parameter defines the total number of symbols per mini-slot and therefore the mini-slot capacity. The mini-slot capacity, $S_{ms}$, is given in symbols by the following expression:

$$S_{ms} = K * C_{ms} \qquad (EQ\ 2)$$

The lower limit on mini-slot capacity is determined by the need to transmit the largest data PDU (including PHY overheads) in a burst of 255 mini-slots. The upper limit on mini-slot capacity is not specifically constrained, but in general is governed by channel efficiency and MAC performance issues.

The valid range of the *codes per mini-slot* parameter is 2 to 32.

*Number of active codes*

The number of active codes parameter allows the number of codes used to carry data to be less than or equal to 128. When the number of active codes is less than 128, low numbered codes starting with code 0 are not used, as shown in Figure 4-11.

There are several reasons why it may be desirable to reduce the number of active codes:

- In extremely noisy plant conditions, a reduction in the number of active codes (along with the corresponding increase in power per code for the remaining codes), can allow reliable operation at reduced capacities. Reduction in active codes from 128 to 32 results in a 6 dB improvement in SNR.
- The number of mini-slots per S-CDMA frame SHALL be an integer. Therefore the codes per mini-slot and number of active codes parameters SHALL be chosen to result in an integral number of mini-slots per frame.
- Code 0, which is described along with the other codes in Section 4.2.12.2, does not have the same spreading properties as the other 127 codes and therefore, under certain channel noise conditions, may suffer a performance degradation relative to the other codes. By reducing the number of active codes to 127 or below, code 0 will not be used.

The valid range of the *number of active codes* parameter is 2 to 128.

High-Capacity Physical Layer Specification
Draft 1 Revision 4

IEEE 802.14a

4.2.3.3.3 Transmission Time

All the mini-slots contained in one S-CDMA frame are transmitted simultaneously. These mini-slots may be transmitted from a single station or may be transmitted from multiple stations, as defined by the bandwidth allocation MAP message and the mini-slot mapping configuration settings (from the UCD). Note that a single station may have more than one burst active in a single S-CDMA frame.

4.2.3.3.4 Latency Considerations

S-CDMA frame timing is derived directly from (is phase locked to) the 10.24 MHz CMTS master clock. Based on the allowable signaling rates and the fact that there are 128 signaling periods in a spreading interval, the S-CDMA frame time SHALL always be a multiple of 25 μsec.

Selecting the number of spreading intervals per frame and the signaling rate therefore exactly define the S-CDMA frame duration. As a specific example, a burst profile defined with 10 spreading intervals per frame with a signaling rate of 2.56 Mbaud would result in a frame duration of 500 μsec.

The amount of additional upstream latency added by the use of S-CDMA mode is exactly one S-CDMA frame duration.

4.2.3.3.5 Bandwidth Allocation MAPs

The CMTS SHALL create MAPs such that the first mini-slot in the MAP aligns with the start of an S-CDMA frame. In other words, the group of mini-slots allocated in a single MAP SHALL exactly span an integral number of S-CDMA frames.

The operator may choose channel parameters to align S-CDMA frames with other important system timing events, such as an 8kHz rate for telephony applications.

The CMTS scheduler SHOULD consider S-CDMA frame duration when scheduling latency sensitive traffic.

4.2.3.3.6 TDMA Bursts on S-CDMA channel

The Initial Ranging and Initial Station Maintenance burst types SHALL be specified (via UCD) to use TDMA mode. The S-CDMA channel will be programmed (via UCD) for $c$ codes per mini-slot, $p$ number of active codes, $k$ spreading intervals per S-CDMA frame, and a resultant $s$ mini-slots per frame, where $s=p/c$.

Then each S-CDMA frame, where TDMA transmission is to occur, will contain exactly $s$ mini-slots, where each mini-slot consists of $c*k$ symbols. Only one TDMA burst may be defined per frame.

In the case where the number of active codes ($p$) is less than 128, the frame will still contain exactly $s$ mini-slots, where each mini-slot consists of $c*k$ symbols, however, the last $(128-p)*k$ symbol times will remain unused. If the TDMA burst spans multiple frames, then the last frame will contain all the unused symbols.

High-Capacity Physical Layer Specification  IEEE 802.14a
Draft 1 Revision 4

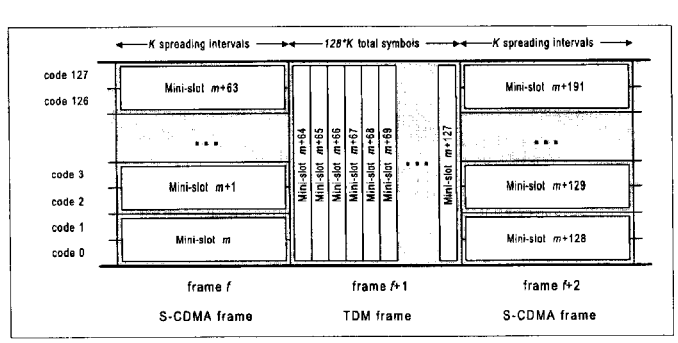

Figure 4-12 S-CDMA and TDMA Intervals

In this case, the CMTS scheduler SHALL ensure that the TDMA interval is aligned to the start of an S-CDMA frame, occurs completely within one or more S-CDMA frames, and SHALL ensure that no S-CDMA bursts are scheduled during these same frames.

*4.2.3.3.7 Mini-slot and frame synchronization*

The CMTS and the CMs require a common protocol for mini-slot numbering. In DOCSIS 1.0, this is achieved solely through recovery of the timestamp. Since the time duration of an S-CDMA frame is not necessarily a power-of-2 multiple of the 10.24 MHz reference, then the timestamp rollover (at $2^{32}$ counts) is not necessarily at an S-CDMA frame boundary. Therefore, an additional synchronization step is required.

The CMTS SHALL identify frame boundaries relative to the timestamp counter on a periodic basis. This is called the timestamp snapshot and must be sent in the UCD for each upstream S-CDMA channel.

The CMTS SHALL maintain a frame counter and a mini-slot counter, and must sample these values along with the timestamp, on a frame boundary, as shown below. The sample interval is non-critical; once each $2^{32}$ counts is sufficient. However, the CMTS SHOULD obtain a new sample prior to sending each UCD message.

High-Capacity Physical Layer Specification  
Draft 1 Revision 4

IEEE 802.14a

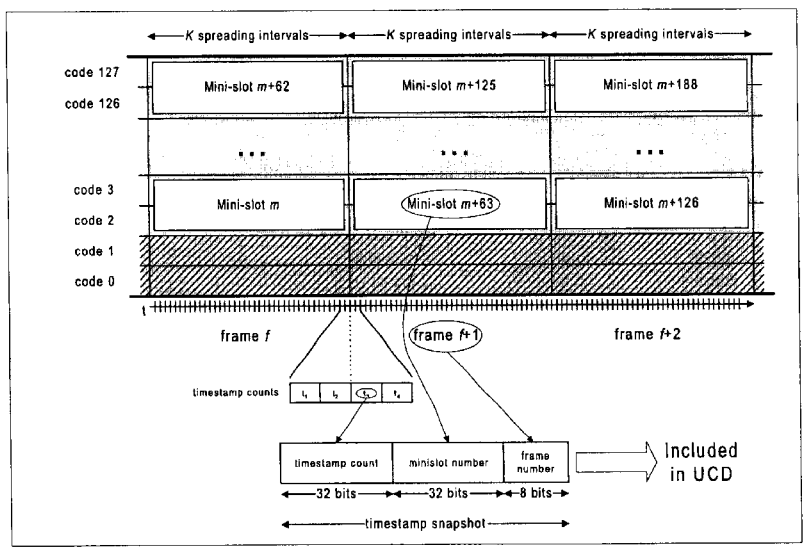

Figure 4-13 Timestamp Snapshot

Each CM SHALL maintain a set of counters functionally identical to the CMTS.

From the UCD message, the CM receives the CMTS timestamp snapshot and parameters from which it can calculate the number of time counts per S-CDMA frame. Using modulo arithmetic, the CM can then calculate accurate values for timestamp, mini-slot, and frame counters at any point into the future.

The CM can then arrange (via hardware) to update its local mini-slot and frame counters at an appropriate timestamp counter value. At this point, the CM representation of mini-slots and frames are aligned with those in the CMTS.

Upon receipt of a SYNC message, the CM SHOULD snapshot its own internal counters, and verify that its internal counters are in proper alignment. The CMTS and CM SHALL implement a 32-bit timestamp counter, a 32-bit mini-slot counter, and an 8-bit frame counter, as follows:

- The mini-slot counter SHALL contain the value of the first mini-slot of the frame when it is sampled. It SHOULD be incremented by the number of mini-slots per frame, once per frame interval. The mini-slot counter will use all 32 bits and mini-slot numbers will therefore range from 0 to $2^{32}-1$.

- The only specified function for the frame counter is to reset the code hopping sequence at the frame 0 (modulo-256) boundary, as defined in Section 4.2.12.2.1.

It is important to note that the frame structure above relates to the entire upstream and not necessarily to the transmission from a single CM. The codes are resources which are allocated to CMs over each S-CDMA frame. The assignment of codes to CMs is performed by the framer as it assigns a burst of symbols a particular order in the two-dimensional matrix of codes and time. This symbol sequencing is described in detail in Section 4.2.12.1.

*High-Capacity Physical Layer Specification*  
*Draft 1 Revision 4*

*IEEE 802.14a*

4.2.4 Relative Processing Delays

The CM MAP processing delay is the time provided between arrival of the last bit of a MAP message at a CM and the effectiveness of this MAP. During this time, the CM should process the MAP message and fill its interleavers (or its framer, in S-CDMA mode) with encoded data. The CMTS SHALL transmit the MAP message early enough to allow the CM MAP processing delay specified below.

The CM MAP processing delay, $D_p$, is given by the equations:

(EQ 3)

$$D_p = 200 + \frac{M}{5.12} \mu\text{sec}, \quad M = M_r + M_t$$

$$M_r = \begin{cases} I_r N_r, & I_r \neq 0 \\ B_r, & I_r = 0 \end{cases} \quad M_t = \begin{cases} I_t N_t, & I_t \neq 0 \\ B_t, & I_t = 0 \end{cases}, \text{TCMmode} \quad M_t = \begin{cases} \dfrac{I_t N_t}{8}, & I_t \neq 0 \\ \dfrac{B_t}{8}, & I_t = 0 \end{cases}, \text{BICMmode}$$

where $M$ is the number of elements in the CM interleavers (in the case of TDMA), or framer (in the cases of S-CDMA). In DOCSIS 1.0/1.1 mode, $M = 0$. In IEEE 802.14a TDMA mode $M = M_r + M_t$, where $M_r$ and $M_t$ are the sizes of the Reed-Solomon and the TCM sub-symbol interleavers, respectively.

For example, in the case of $M_r = 2048 = M_t$, which are the maximum interleavers' sizes, the MAP processing time is 1000 μSec.

In S-CDMA mode, $M = 128K$, where $K$ is the number of spreading intervals per frame. For example in the case of $K = 32$, which corresponds to the maximum framer size, the CM MAP processing time is 1000 μSec.

Notes:

1. The CM MAP processing delay does not include downstream FEC de-interleaving delay (see SP-RFlv1.1-I01-990311, section 7.1.5).

2. The "effectiveness of the MAP" relates to the beginning of the burst frame at the RF output of the CM. In the S-CDMA mode, "effectiveness of the MAP" relates to the beginning (at the RF output of the CM) of the first spreading interval of the S-CDMA frame which contains the burst.

4.2.5 Mapping from Data Bytes to Modulation Symbols

Figure 4-14 shows the processing steps performed by a CM when it receives a grant for upstream transmission. Six processing steps are indicated by which $N_d$ bytes are converted into a packet of $N_s$ modulation symbols that fit into the granted window of mini-slots. The CMTS must know from the number of granted mini-slots how many bytes the CM is sending. Otherwise, the CMTS cannot invert the encoding and interleaving steps performed in a CM. To ensure this, the CM must first determine the largest number $N_d$ of bytes defining a packet of symbols that fits into the granted sequence of mini-slots. If a CM has fewer than $N_d$ data bytes to send, then it must pad these bytes with zero bytes. Thus, both the CMTS and the CM know how many bytes are encoded.

*High-Capacity Physical Layer Specification*  
*Draft 1 Revision 4*

*IEEE 802.14a*

An example of the required processing steps for asynchronous operation follow:

1. Reed-Solomon FEC encoding for given codeword parameters $N_r$ (number of bytes in a codeword), k (the number of data bytes in a codeword), and t (the corrections capability in bytes), where $N_r = k+2*t$. $N_d$ may include zero-padded codewords. The last codeword may be shortened. $N_f = N_d + n \times (2*t)$ bytes are obtained, where n = ceil($N_d/k$).

2. Reed-Solomon Byte interleaving (used in TDMA mode only): block interleaver, $N_r \times I_r$, $I_r$ = ceil($N_f/N_r$), where $N_r$ is the RS code word size (see Section 4.2.7)

3. Addition of scrambling sequence

4. Trellis or convolutional encoding (with tail bits to return to a known state in either case) / inner interleaving (on coded subsymbols for TCM and on coded bits for BICM)

5. Modulation encoding: uncoded, TCM or BICM. $N_s$ symbols are obtained

6. Prepend preamble symbols. Thus, $N_p$ symbols comprising preamble and data symbols are obtained, which correspond to the granted window size.

Note that in step 5, the number of bytes produced by the Reed-Solomon encoder may not map into an integer number of symbols. In this case the last symbol must be padded with "zero" bits after all data bits are processed. Also note that for synchronous operation, the preamble insertion may precede the inner interleaver.

*High-Capacity Physical Layer Specification*  
*Draft 1 Revision 4*                                                                                    *IEEE 802.14a*

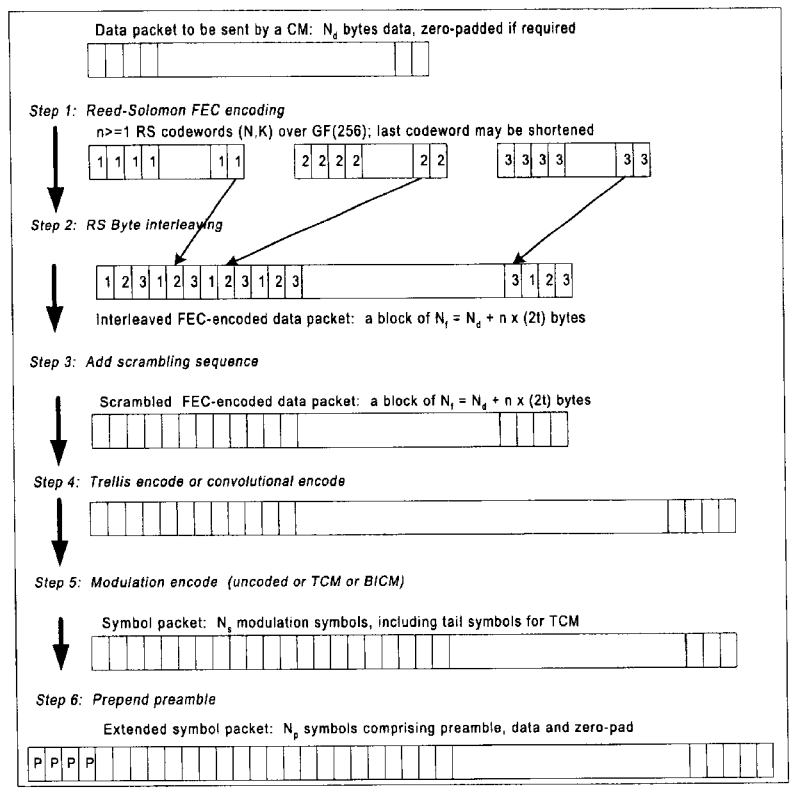

Figure 4-14 Processing steps from bytes to modulation symbols in one CM

4.2.6 Reed-Solomon Encoding

4.2.6.1 R-S Encode Modes

The upstream modulator SHALL provide the following selections: Reed-Solomon codes over GF(256) with t = 1 to 16 or no FEC coding.

The following Reed-Solomon generator polynomial SHALL be supported:

$$g(x) = (x+\alpha_{rs}^{0})(x+\alpha_{rs}^{1})...(x+\alpha_{rs}^{2t-1}) \quad (EQ\ 4)$$

where the primitive element $\alpha_{rs}$ is 02 hex.

The following Reed-Solomon primitive polynomial SHALL be supported:

*High-Capacity Physical Layer Specification*  
*Draft 1 Revision 4*  
*IEEE 802.14a*

$$p(x) = x^8 + x^4 + x^3 + x^2 + 1 \qquad (EQ\ 5)$$

The upstream modulator SHALL provide codewords from a minimum size of 18 bytes (16 information bytes [k] plus two parity bytes for t = 1 error correction) to a maximum size of 255 bytes (information plus parity-bytes). The uncoded word size can have a minimum of one byte.

In Shortened Last Codeword mode, the CM SHALL provide the last codeword of a burst shortened from the assigned length of k data bytes per codeword, as described in Section 4.2.6.4.2 of this document.

The value of *t* SHALL be configured in response to the Upstream Channel Descriptor from the CMTS.

4.2.6.2  R-S Bit-to-Symbol Ordering

The input to the Reed-Solomon Encoder is logically a serial bit stream from the MAC layer of the CM, and the first bit of the stream SHALL be mapped into the most significant bit (MSB) of the first Reed-Solomon symbol into the encoder. The MSB of the first symbol out of the Reed-Solomon byte interleaver SHALL be mapped into the first bit of the serial bit stream fed to the Scrambler.

[Note that the MAC byte-to-serial upstream convention calls for the byte least significant bit [LSB] to be mapped into the first bit of the serial bit stream per Section 6.2.1.3.]

4.2.6.3  R-S Frame Structure

Figure 4-15 shows two examples of the R-S frame structure with R-S codewords only: one where the packet length equals the number of information bytes in a codeword, and another where the packet length is longer than the number of information bytes in one codeword, but less than in two codewords. Example 1 illustrates the fixed codeword-length mode, and Example 2 illustrates the shortened last codeword mode. These modes are defined in Section 4.2.6.4.

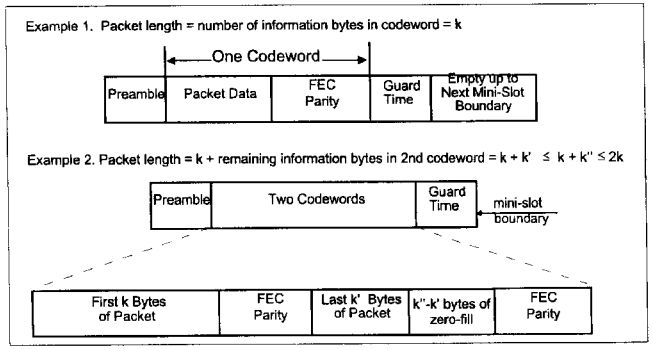

Figure 4-15 Example R-S Frame Structures with Flexible Burst Length Mode

4.2.6.4  R-S Codeword Length

When Reed-Solomon FEC is enabled, the CM operates in either fix-length codeword mode or in shortened-last codeword mode. The minimum number of information bytes in a codeword in either mode is 16.

*High-Capacity Physical Layer Specification*  
*Draft 1 Revision 4*                                                                                                        *IEEE 802.14a*

The following descriptions apply to an allocated grant of mini-slots (the allocation of mini-slots is discussed in Section 6 of this document). The intent of the description is to define rules and conventions such that CMs request the proper number of mini-slots and the CMTS PHY knows what to expect regarding the R-S FEC framing in both fixed codeword length and shortened last codeword modes.

4.2.6.4.1 Fixed R-S Codeword Length

With the fixed-length codewords, after all the data are encoded, zero-fill will occur in this codeword if necessary to reach the assigned k data bytes per codeword, and zero-fill SHALL continue up to the point when no additional fixed-length codewords can be inserted before the end of the last allocated mini-slot in the grant, accounting for R-S parity and guard time.

4.2.6.4.2 Shortened Last R-S Codeword

As shown in Figure 4-15, let k' = the number of information bytes that remain after partitioning the information bytes of the burst into full-length (k burst data bytes) codewords. The value of k' is less than k. Let k" = the number of burst data bytes plus zero-fill bytes in the shortened last codeword. The CM will encode the data bytes of the burst (including the MAC Header) using the assigned codeword size (k information bytes per codeword) until either all the data are encoded, or the number of data bytes remaining is less than k. Shortened last codewords shall not have less than 16 information bytes, and this is to be considered when CMs make requests of mini-slots. In shortened last codeword mode, the CM will zero-fill data if necessary until the end of the mini-slot allocation, which in most cases will be the next mini-slot boundary, accounting for R-S parity and guard time. In many cases, only k" - k' zero-fill bytes are necessary to fill out a mini-slot allocation with $16 <= k" <= k$ and $k' <= k"$.

The CM is required to zero-fill data until the point where no additional fixed-length codewords can be inserted before the end of the last allocated mini-slot in the grant (accounting for R-S parity and guard time), and then, if possible, a shortened last codeword of zero-fill shall be inserted to fit into the mini-slot allocation.

If, after zero-fill of additional codewords with k information bytes, there are fewer than 16 bytes remaining in the allocated grant of mini-slots, accounting for parity and guard time, then the CM shall not create this last shortened codeword.

4.2.7 R-S Byte Interleaving

R-S block codeword interleaving in a byte (R-S symbol) format SHALL be performed after R-S FEC encoding to spread the burst noise encountered in the channel. To minimize latency, the R-S interleaving can be turned off. Note that R-S byte interleaving is available in TDMA mode only and is not available in S-CDMA mode. The two parameters that define the structure of the block interleaver are the interleaver depth ($I_r$) and the block length ($N_r$), which is the R-S codeword size. Figure 4-16 illustrates the R-S byte interleaver with an $I_r$-row by $N_r$-column block. The input R-S byte sequences will be written one row at a time (1 to $I_r$), and read out in columns (1 to $N_r$) after the block is completely filled. (Note: At the CMTS, the deinterleaver performs the reverse operation. The received sequence is entered into the deinterleaver block by columns, and fetched out by rows.)

High-Capacity Physical Layer Specification  
Draft 1 Revision 4

IEEE 802.14a

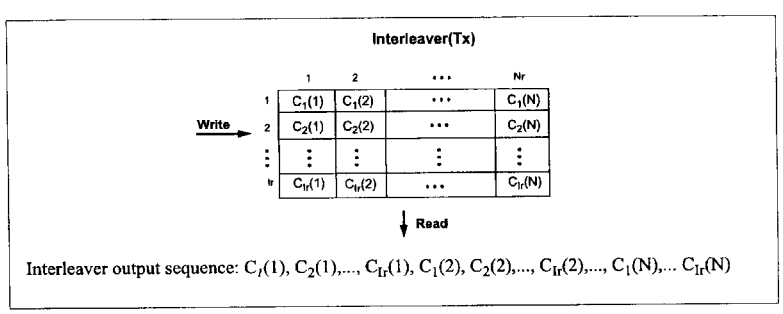

Figure 4-16 Reed-Solomon Byte Interleaving Operation

The interleaver or deinterleaver SHALL support block sizes up to 2048 bytes and the interleaver depth ($I_r$) shall be programmable up to the maximum interleaver depth ($I_{r,max}$) per a given R-S block length. When $I_r$ is specified as zero, $I_r$ is dynamically configured at the CM. In this case, the total interleaver block size parameter, $B_r$, ($B_r <=$ 2048 bytes) should also be specified in the burst profile to calculate $I_r$. The choice of $B_r$ directly affects the latency incurred due to the R-S byte interleaving. $B_r$ is ignored in the fixed $I_r$ mode.

In the fixed mode, if the burst packet size is longer than the interleaver block size ($N_r * I_r$), the packet SHALL be interleaved by segments of $N_r * I_r$ bytes. The total of 2048 bytes corresponds to the maximum interleaver depth of 8 for the maximum block length ($N_{r,max}$) of 255 bytes. When the block size gets smaller, the corresponding maximum interleaver depth can also increase accordingly. The maximum possible depth for a given block length is actually given as:

$$I_{r,max} = floor\ (2048/N_r), \qquad (EQ\ 6)$$

assuming the fixed codeword (and fixed $I_r$) option is enabled. Table 4-1 shows an example of the maximum possible interleaver depth for various block sizes.

Table 4-1  Programmable Interleaving Example (Fixed $I_r$/Fixed R-S codeword mode)

| Block Length ($N_r$ bytes) | Max. Interleaver Depth ($I_r$ max bytes) |
|---|---|
| 255 | 8 |
| 200 | 10 |
| 128 | 16 |
| 100 | 20 |
| 64 | 32 |
| 32 | 64 |
| 20 | 102 |

When the shortened last codeword option is enabled, the last codeword shall be terminated for interleaving purposes as well, as shown in Figure 4-17.

Unless the total packet size is related to the R-S interleaver block size ($N_r * I_r$), it is possible that the last few codewords (including the very last shortened codeword) may not be interleaved with enough depth.

*High-Capacity Physical Layer Specification*  
*Draft 1 Revision 4*   IEEE 802.14a

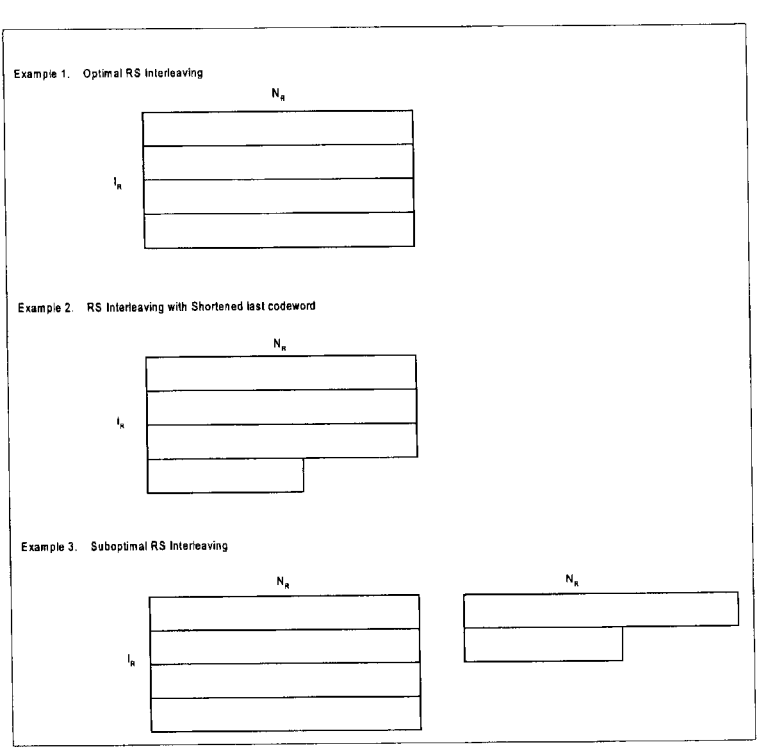

Figure 4-17 R-S Byte Interleaving Example

In the dynamic $I_r$ mode ($I_r = 0$), $I_r$ is configured at the CM according to EQ (7) when the R-S encoded data packet size ($N_f$) is $<= B_r$ bytes:

$$I_r = ceil\ (N_f/N_r) \qquad (EQ\ 7)$$

where $N_f$ is the total number of bytes in the Reed-Solomon encoded data packet as defined in Figure 4-14. If the burst packet size is larger than $B_r$ bytes, then the packet SHALL be interleaved by segments less than or equal to $B_r$ bytes maximum, and the following rule SHALL apply:

Total number of interleaver rows:

$$I_{tot}^o = ceil(N_f/N_r). \qquad (EQ\ 8)$$

Maximal number of rows per segment:

$$I_{r,\ max} = floor(B_r/N_r). \qquad (EQ\ 9)$$

*High-Capacity Physical Layer Specification*  
*Draft 1 Revision 4*

*IEEE 802.14a*

Number of segments:

$$N_s^o = ceil\left(I_{tot}^o / I_{r,max}\right). \quad (EQ\ 10)$$

Then for segment m, $I_r^{(m)}$ is calculated as follows ($m = 1...N_s^o$):

$$I_r^{(m)} = ceil\left(I_{tot}^{(m-1)} / N_s^{(m-1)}\right) \quad (EQ\ 11)$$

$$N_s^{(m)} = N_s^{(m-1)} - 1 \quad (EQ\ 12)$$

$$I_{tot}^{(m)} = I_{tot}^{(m-1)} - I_r^{(m)} \quad (EQ\ 13)$$

Example 1: $N_f = 2100, N_r = 200, I_r = 0, B_r = 2048;$ $$I_{tot}^o = ceil(N_f/N_r) = 11 \quad (EQ\ 14)$$

$$I_{r,max} = floor(2048/N_r) = 10 \quad (EQ\ 15)$$

$$N_s^o = ceil\left(I_{tot}^o / I_{r,max}\right) = 2 \quad (EQ\ 16)$$

For m = 1, $$I_r^1 = ceil\left(I_{tot}^0 / N_s^0\right) = 6 \quad (EQ\ 17)$$

$$N_s^1 = N_s^0 - 1 = 1 \quad (EQ\ 18)$$

$$I_{tot}^1 = I_{tot}^0 - I_r^1 = 5 \quad (EQ\ 19)$$

For m = 2 ($N_s^o$), $$I_r^2 = ceil\left(I_{tot}^1 / N_s^1\right) = 5 \quad (EQ\ 20)$$

$$N_s^2 = N_s^1 - 1 = 0 \quad (EQ\ 21)$$

$$I_{tot}^2 = I_{tot}^1 - I_r^2 = 0 \quad (EQ\ 22)$$

Copyright © 1999 IEEE. All rights reserved.  
This is an unapproved IEEE Standards Draft, subject to change.

TI-30301

High-Capacity Physical Layer Specification
Draft 1 Revision 4

IEEE 802.14a

Example 2: $N_f = 2100$, $N_r = 200$, $I_r = 0$, $B_r = 1024$;

$$I_{tot}^o = ceil(N_f/N_r) = 11 \quad (EQ\ 23)$$

$$I_{r,max} = floor(1024/N_r) = 5 \quad (EQ\ 24)$$

$$N_s^o = ceil\left(I_{tot}^o/I_{r,max}\right) = 3 \quad (EQ\ 25)$$

For m = 1, $$I_r^1 = ceil\left(I_{tot}^0/N_s^0\right) = 4 \quad (EQ\ 26)$$

$$N_s^1 = N_s^0 - 1 = 2 \quad (EQ\ 27)$$

$$I_{tot}^1 = I_{tot}^0 - I_r^1 = 7 \quad (EQ\ 28)$$

For m = 2, $$I_r^2 = ceil\left(I_{tot}^1/N_s^1\right) = 4 \quad (EQ\ 29)$$

$$N_s^2 = N_s^1 - 1 = 1 \quad (EQ\ 30)$$

$$I_{tot}^2 = I_{tot}^1 - I_r^2 = 3 \quad (EQ\ 31)$$

For m = 3 ($N_s^o$), $$I_r^3 = ceil\left(I_{tot}^2/N_s^2\right) = 3 \quad (EQ\ 32)$$

$$N_s^3 = N_s^2 - 1 = 0 \quad (EQ\ 33)$$

$$I_{tot}^3 = I_{tot}^2 - I_r^3 = 0 \quad (EQ\ 34)$$

In these examples, optimal segmentations have been achieved at a given total interleaver block size.

4.2.8 Scrambler (Randomizer)

The upstream modulator SHALL implement a scrambler (shown in Figure 4-18) where the 15-bit seed value SHALL be arbitrarily programmable.

Copyright © 1999 IEEE. All rights reserved.
This is an unapproved IEEE Standards Draft, subject to change.

TI-30301

*High-Capacity Physical Layer Specification*  
*Draft 1 Revision 4*

IEEE 802.14a

At the beginning of each burst, the register is cleared and the seed value is loaded. The seed value SHALL be used to calculate the scrambler bit which is combined in an XOR with the first bit of data of each burst (which is the MSB of the first symbol following the last symbol of the preamble).

The scrambler seed value SHALL be configured in response to the Upstream Channel Descriptor from the CMTS.

The polynomial SHALL be $x^{15} + x^{14} + 1$.

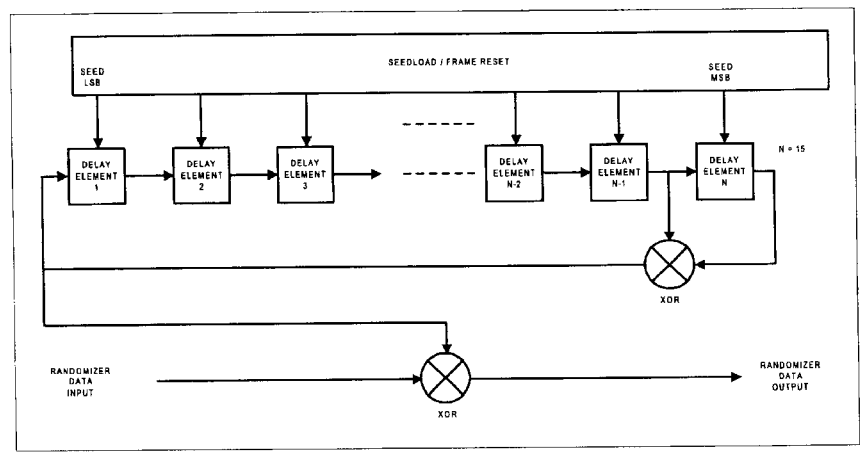

Figure 4-18 Scrambler Structure

The bit ordering at the input to the scrambler corresponds to the convention presented in Section 4.2.6.2. The output of the scrambler follows this same MSB-first convention.

4.2.9 Modulation Encoding

The process of modulation encoding transforms a packet of $N_f$ R-S-encoded, interleaved, and bit-randomized bytes into a packet of $N_s$ two-dimensional modulation symbols. The $N_f$ input bytes are interpreted as a binary sequence of $N_f \times 8$ bits, in which most-significant bits of bytes occur first in time. Modulation encoding is functionally identical for TDMA and S-CDMA modes of transmission.

Modulation formats are specified for uncoded modulation with m = 2 to 6 bits per symbol, and Trellis-coded modulation with m = 1 to 6 bits per symbol, and bit-interleaved-coded modulation with m = 1 to 6 bits per symbol. Station transmitters SHALL support all modulation formats defined in Section 4.2.9.2.

Modulation encoding includes pre-pending of $n_p$ low-power or high-power preamble symbols to a generated sequence of $n_i$ data symbols, and appending $n_t$ tail symbols in the case of Trellis coded modulation. Thus, a packet of $N_f$ input bytes is transformed into a packet of $N_p = n_p + n_i + n_t$ modulation symbols.

Modulation encoding does not define the temporal order of symbol transmission, nor the codes to be used in S-CDMA mode. Prior to transmission, the $N_s$ symbols will generally be rearranged in time. Zero fill symbols

*High-Capacity Physical Layer Specification*  
*Draft 1 Revision 4*  
IEEE 802.14a will be appended to fill a gap to the last mini-slot boundary in a block of mini-slots granted for upstream transmission.

4.2.9.1 Encoding Rates

In the case of TDMA mode, the modulation encoder SHALL generate modulation symbols at sufficient speed to support modulation rates (= signaling rates) of $R_s = 1/T_s = 160, 320, 640, 1280, 2560,$ and $5120$ ksym/sec for all modulation formats.

In the case of S-CDMA mode, the modulation encoder SHALL generate modulation symbols at sufficient speed to support signaling rates of $R_s = 1/T_s = 1280, 2560,$ and $5120$ ks/sec for all modulation formats. The effective modulation rate depends on the number of CDMA codes simultaneously used.

4.2.9.2 Symbol Constellations

Figure 4-19 shows the employed symbol constellations. The symbol labels are defined in Section 4.2.9.3 for uncoded modulation, and in Section 4.2.9.6 for Trellis coded modulation. The QPSK0/QPSK1, 16QAM-SQ, and 64QAM-SQ constellations are referred to as *square* (SQ) constellations. The 8QAM-DS, 32QAM-DS, and 128QAM-DS constellations are called *double-square* (DS) constellations.

Modulation symbols are defined as complex integers with real and imaginary parts in the range [-15,15], so that symbol values can be represented by 2 x 5 bits. $E_{av}$ denotes the average constellation energy for equally likely symbols. In Figure 4-19, for each constellation the absolute values of $E_{av}$ and differences in dB compared to QPSK0 are given.

The QPSK0 constellation is employed for low-power preamble and QPSK data symbols. Use of QPSK1 is restricted to high-power preamble symbols. The other constellations are only used for QAM data symbols.

All constellations permit power-efficient Tomlinson-Harashima precoding with the same modulo value of $M = 32$ (see Section 4.2.13).

Copyright © 1999 IEEE. All rights reserved.  
This is an unapproved IEEE Standards Draft, subject to change.

TI-30301

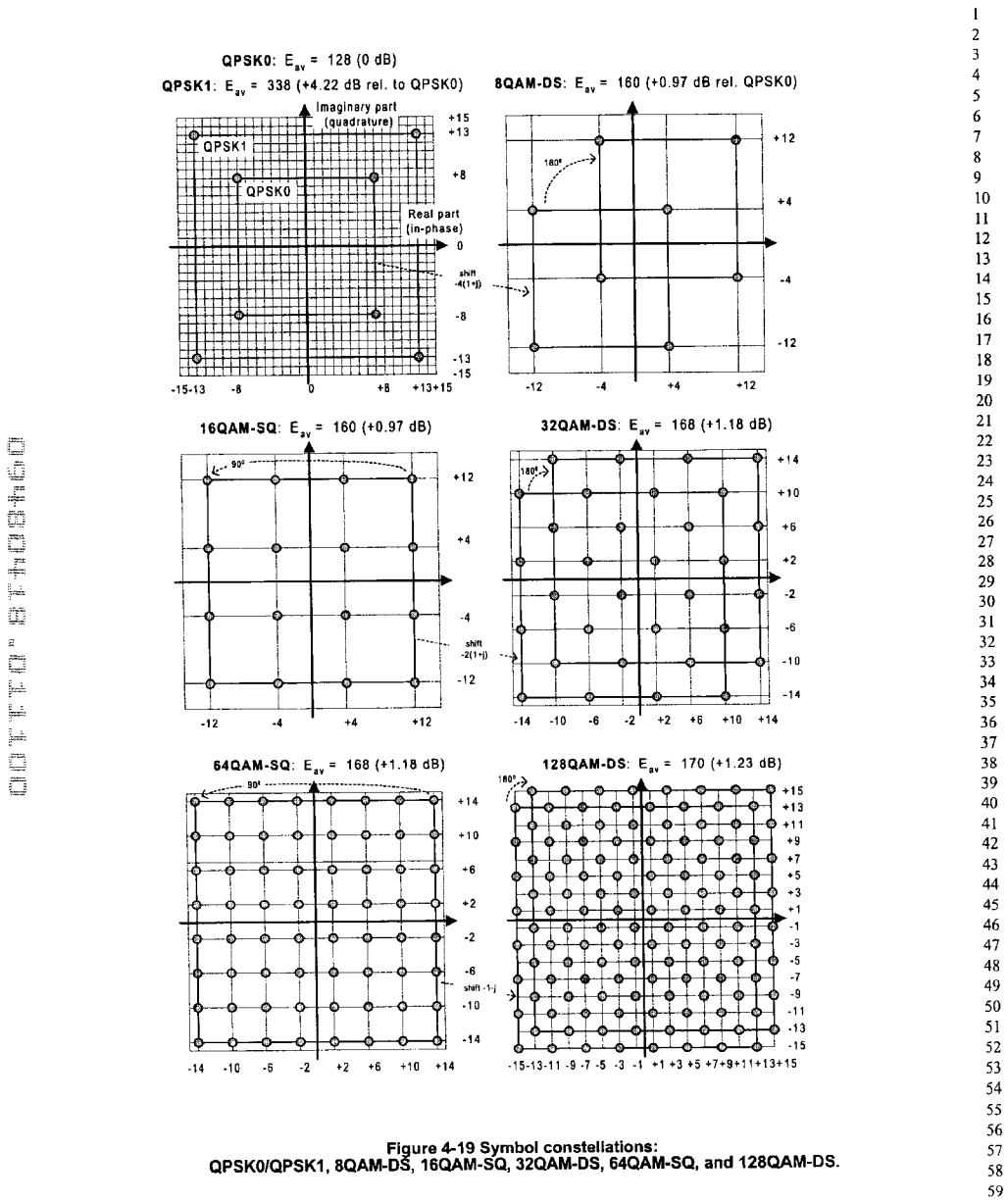
Figure 4-19 Symbol constellations:
QPSK0/QPSK1, 8QAM-DS, 16QAM-SQ, 32QAM-DS, 64QAM-SQ, and 128QAM-DS.

The QAM constellations can be constructed iteratively from the QPSK0 constellation. The 8QAM-DS constellation is obtained by shifting the QPSK0 constellation by $-4(1+j)$ and adding 180°-rotated points. Then, by adding 90°-rotated points the 16QAM-SQ constellation is obtained. This two-step process is repeated with decreasing shift values and alternating 180° and 90° rotations, as indicated in Figure 4-19. The two steps are concisely defined by (1) Let $B0 = 2^{2n}QAM\text{-}SQ - 2^{3-n}(1+j)$ and $B1 = -B0$; then $2^{2n+1}QAM\text{-}DS = B0 \cup B1$ (2) Let $B0 = 2^{2n+1}QAM\text{-}DS$; and $B1 = j*B0$; then $2^{2n+2}QAM\text{-}SQ = B0 \cup B1$.

4.2.9.3 Uncoded Modulation without Differential Encoding

The CM SHALL support uncoded modulation for transmission of m = 2, 3, 4, 5, and 6 bits per symbol with QPSK0, 8QAM-DS, 16QAM-SQ, 32QAM-DS, and 64QAM-SQ constellations, without differential encoding.

Figure 4-20 to Figure 4-24 define the binary symbol labels $[x^m, ... x^2, x^1]$ for uncoded modulation. Gray-code labeling of the SQ constellations is accomplished by Gray-code labeling real and imaginary parts independently. The 8QAM-DS and 32QAM-DS constellations do not permit perfect Gray-code labeling. Some violations with Hamming distances of 2 between adjacent labels must be admitted as shown in Figure 4-21 and Figure 4-23. Figure 4-22 defines an additional 16QAM-SQ labeling for quadrant-differential encoding.

The sequence of $N_f$ input bytes is segmented into $n_i = \text{ceil}(N_f/m)$ m-bit labels. If m does not divide $N_f$, the last label must be padded with zero bits. Figure 4-25 illustrates the assignment of input bytes to symbol labels for uncoded 32QAM-DS (m = 5).

The figure also shows pre-pending of $n_p$ QPSK0 or QPSK1 preamble symbols. The sequence of $x^2x^1$ bits for the selection of preamble symbols is a substring of the preamble superstring defined for the upstream channel.

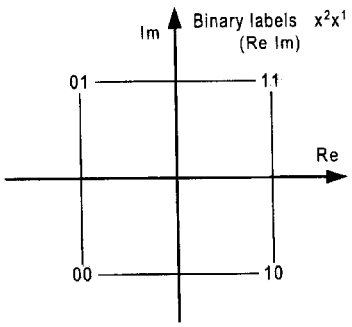

Figure 4-20 QPSK0/1 Gray-code labeling for uncoded modulation and preamble encoding

*High-Capacity Physical Layer Specification*  
*Draft 1 Revision 4*
*IEEE 802.14a*
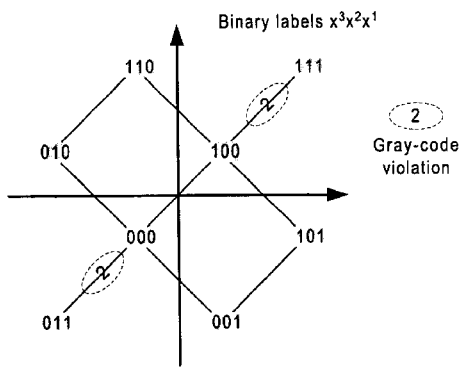
Figure 4-21 8QAM-DS quasi-Gray code labeling for uncoded modulation.
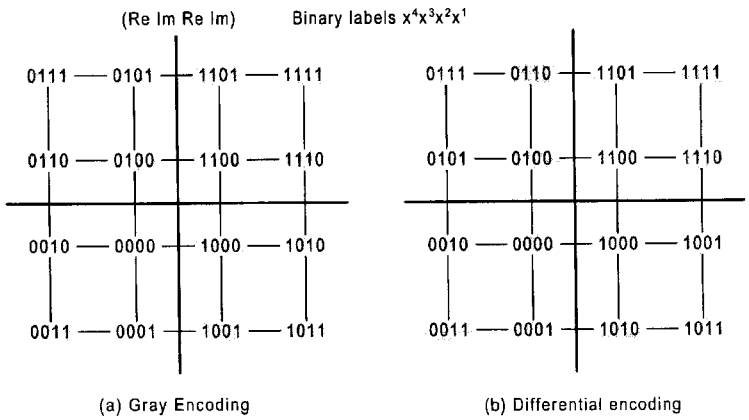
(a) Gray Encoding        (b) Differential encoding
Figure 4-22 16QAM-SQ Labeling for Uncoded Modulation

High-Capacity Physical Layer Specification  
Draft 1 Revision 4
IEEE 802.14a
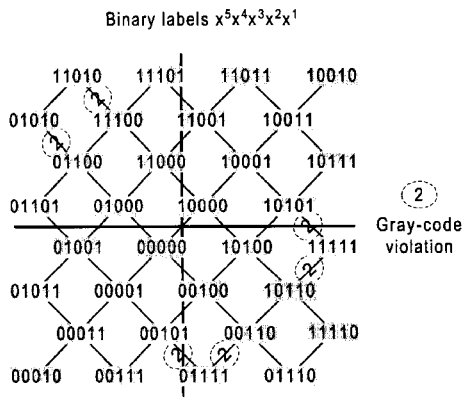
Figure 4-23 32QAM-DS quasi-Gray code labeling for uncoded modulation
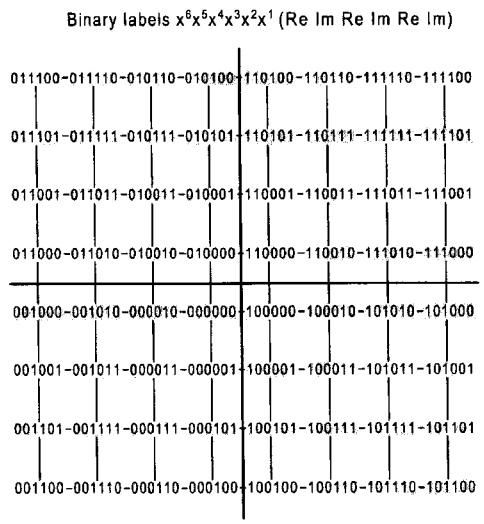
Figure 4-24 64QAM-DS Gray-code labeling for uncoded modulation

*High-Capacity Physical Layer Specification*  
*Draft 1 Revision 4*

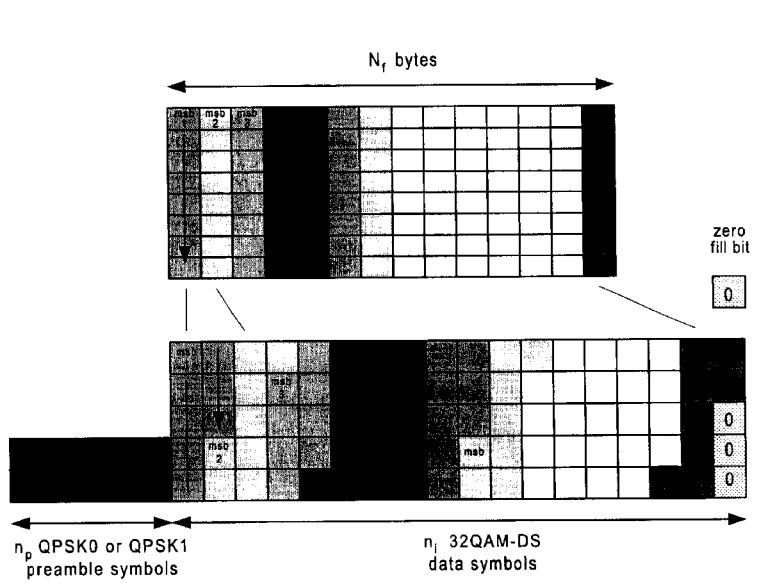

Figure 4-25 Example: mapping bytes to binary labels for uncoded 32QAM-DS, and pre-pending preamble symbols

4.2.9.4 Uncoded Modulation with Differential Encoding

To maintain backwards compatibility with DOCSIS 1.0/1.1, the CM SHALL support quadrant-differential encoding for uncoded QPSK (m = 2) and 16QAM-SQ (m = 4). If enabled, differential encoding SHALL be applied to preamble and data symbols.

Differentially encoded QPSK modulation is accomplished with the Gray-code labeling defined in Figure 4-20. At the $n^{th}$ symbol time, a QPSK symbol is selected by differentially-encoded label bits $x'^2(n)x'^1(n)$, which are used instead of $x^2(n)x^1(n)$. The differential encoding operation is defined in Table 4-2.

For differentially encoded 16QAM-SQ modulation the mapping given in Figure 4-22(b) is used. The label bits $x^4(n)x^3(n)$ are replaced by differentially encoded bits $x'^4(n)x'^3(n)$, while bits $x^2(n)x^1(n)$ remain unchanged. The encoding operation is equivalent to the operation specified in Table 4-2 for $x^2x^1$.

Table 4-2 Differential encoding of bits $x^2x^1$ for QPSK0/1  
(minus signs indicate bit inversion; for 16QAM-SQ replace $x^2x^1$ by $x^4x^3$)

| $x^2(n)\ x^1(n)$ | Quadrant phase change | $x'^2(n)\ x'^1(n)$ |
|---|---|---|
| 0 0 | 0° | $x'^2(n-1)\ x'^1(n-1)$ |
| 0 1 | 90° | $-x'^1(n-1)\ x'^2(n-1)$ |

High-Capacity Physical Layer Specification  
Draft 1 Revision 4

IEEE 802.14a

| $x^2(n)\ x^1(n)$ | Quadrant phase change | $x'^2(n)\ x'^1(n)$ |
|---|---|---|
| 1 1 | 180° | $-x'^2(n-1)\ -x'^1(n-1)$ |
| 1 0 | 270° | $x'^1(n-1)\ -x'^2(n-1)$ |

4.2.9.5 Bit Interleaved Coded Modulation

The upstream modulator SHALL support Bit Interleaved Coded Modulation (BICM) for two-dimensional modulation symbols. BICM modulation encoding consists of a rate ½ convolutional encoder with constraint length K = 7, bit puncturing unit, and bit interleaver, as shown in Figure 4-26.

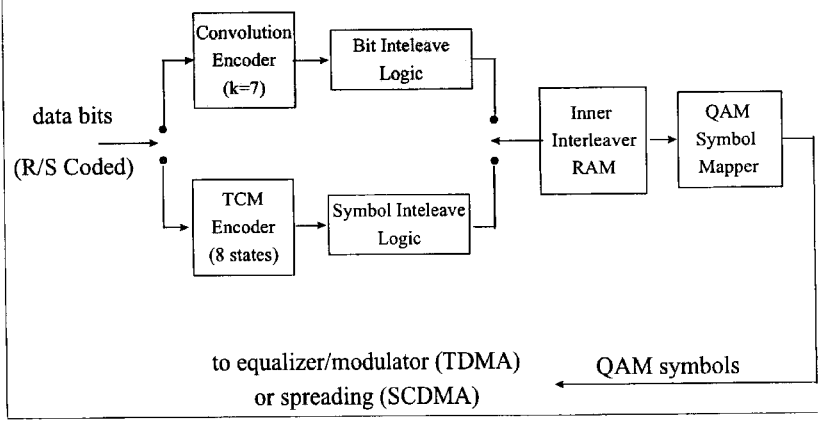

Figure 4-26 BICM Block Diagram

*4.2.9.5.1 BICM Bit Encoder*

Figure 4-27 shows a 3/4 rate BICM punctured convolutional encoder, which consists of a 1/2 rate convolutional encoder followed by a puncturing unit. In the puncturing unit, a "1" indicates that a channel symbol is to be transmitted and "0" indicates a channel symbol is to be deleted. Figure 4-27 shows one particular puncturing pattern; other possible patterns are listed in Table 4-3.

*High-Capacity Physical Layer Specification*  
*Draft 1 Revision 4*  
*IEEE 802.14a*

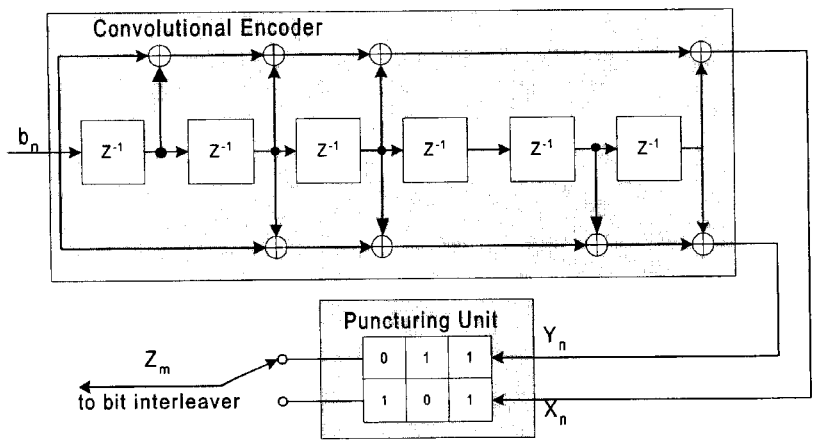

Figure 4-27 BICM Punctured Convolution Encoder

The constraint length of the convolution encoder is 7, and its generator polynomials are 133 octal and 171 octal.

Initial state (zero): $b_{-1} = b_{-2} = b_{-3} = b_{-4} = b_{-5} = b_{-6} = 0$

Input bits from randomizer: $b_0, b_1, \ldots, b_{8 \cdot Nf-1}$

Final state (tail): $b_{8 \cdot Nf} = b_{8 \cdot Nf+1} = b_{8 \cdot Nf+2} = b_{8 \cdot Nf+3} = b_{8 \cdot Nf+4} = b_{8 \cdot Nf+5} = 0$ Convolutional encoder output bits:

$x_n = \text{XOR}(b_n, b_{n-1}, b_{n-2}, b_{n-3}, b_{n-6})$, $n = 0, 1, \ldots, 8*Nf+5$ $y_n = \text{XOR}(b_n, b_{n-2}, b_{n-3}, b_{n-5}, b_{n-6})$, $n = 0, 1, \ldots, 8*Nf+5$ Puncturing unit output bits:

$Z_m$, $m = 0, 1, \ldots, M-1$ where $M = \text{ceil}((8*Nf+6)/\text{Code\_Rate})$ The puncturing pattern of the puncturing unit is shown in Table 4-3.

*High-Capacity Physical Layer Specification*  *IEEE 802.14a*
*Draft 1 Revision 4*

Table 4-3 Puncturing Pattern

| Code Rate | Puncturing Pattern | Output ($Z_m$) |
|---|---|---|
| 1/2 | x: 1 <br> y: 1 | $x_n\ y_n$ (n = 0,1,2...) |
| 2/3 | X: 1 0 <br> y: 1 1 | $x_n\ y_n\ y_{n+1}$ (n = 0, 2, 4...) |
| 3/4 | x: 1 0 1 <br> y: 1 1 0 | $x_n\ y_n\ y_{n+1}\ x_{n+2}$ (n = 0, 3, 6...) |
| 5/6 | x: 1 0 1 0 1 <br> y: 1 1 0 1 0 | $x_n\ y_n\ y_{n+1}\ x_{n+2}\ y_{n+3}\ x_{n+4}$ |

The puncturing mode and the constellation to be used for m = 1,2,..6 information bits per symbol are as follows:

Table 4-4 Constellation and Puncturing Mode

| input bits/symbol | 1 | 2 | 3 | 4 | 5 | 6 |
|---|---|---|---|---|---|---|
| Constellation | QPSK | 16QAM | 16QAM | 64QAM | 64QAM | 256QAM |
| d [coded bits/symbol] | 2 | 4 | 4 | 6 | 6 | 8 |
| Coding rate | 1/2 | 1/2 | 3/4 | 2/3 | 5/6 | 3/4 |

When M (number of bits at puncturing unit output) is not an integer multiple of d (number of convolutionally coded bits per symbol), d-rem(M/d) zero bits are padded to the puncturing unit output.

4.2.9.5.2  Symbol Mapping for BICM

When using BICM, the CM SHALL use the QPSK, 16-QAM, 64-QAM or 256QAM Gray coded constellations. The QPSK, 16QAM and 64QAM Gray coded constellations are as defined for uncoded modulation in Section 4.2.9.3. In the 256QAM mode of BICM, the CM will use a conventional Gray code constellation. The input bit definition (MSB-LSB) will be $I_3\ Q_3\ I_2\ Q_2\ I_1\ Q_1\ I_0\ Q_0$. The Gray code mapping of the real and the imaginary parts of the symbol is given in Table 4-5.

Table 4-5  Gray Code Symbol Mapping

| B3 B2 B1 B0 | 0010 | 0011 | 0001 | 0000 | 0100 | 0101 | 0111 | 0110 |
|---|---|---|---|---|---|---|---|---|
| value | -15 | -13 | -11 | -9 | -7 | -5 | -3 | -1 |
| B3 B2 B1 B0 | 1110 | 1111 | 1101 | 1100 | 1000 | 1001 | 1011 | 1010 |
| value | 1 | 3 | 5 | 7 | 9 | 11 | 13 | 15 |

The symbol mapper input bits will be read serially from the bit interleaver (Section 4.2.10.3). The first bit read into a symbol will be written to the MSB of the symbol label.

4.2.9.6  Trellis Coded Modulation (TCM)

The CM SHALL support trellis coded modulation for transmission of m = 1, 2, 3, 4, 5, and 6 bits per symbol with QPSK0, 8QAM-DS, 16QAM-SQ, 32QAM-DS, 64QAM-SQ, and 128QAM-DS constellations, respectively.

Figure 4-28 shows the employed 8-state TCM encoder. The systematic convolutional encoder adds the coded bit $x^0$ to the input bits $x^m, \ldots x^3, x^2, x^1$. For m = 1, only input bit $x^1$ is used ($x^2 = 0$), and encoding is reduced to rate-1/2 coding. An asymptotic coding gain of 4.8 dB is accomplished compared to uncoded BPSK modulation. For

*High-Capacity Physical Layer Specification*  
*Draft 1 Revision 4* m ≥ 2, rate-2/3 encoding is in effect, and an asymptotic coding gain of ≈4.0 dB is achieved compared to uncoded modulation with the same value of m.

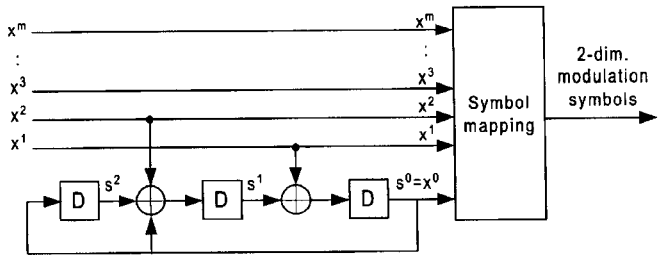

Figure 4-28 8-state TCM encoder for m = 1 to 6 bits per symbol.

TCM requires symbol mapping based on set partitioning rules. The mappings of binary labels [$x^m$ ... $x^2$ $x^1$ $x^0$] to symbols are defined in Figure 4-29 to Figure 4-31. For higher-order constellations, the labels are specified in octal form: [... $o^1$, $o^0$], $o^1 = 4x^5+2x^4+x^3$, $o^0 = 4x^2+2x^1+x^0$. The labeling is based on the iterative construction of constellations explained in Section 4.2.9.2. In each expansion step, subset $b_0$ of the new constellation obtains the left-shifted binary labels of the original constellation with an inserted bit $x^0 = 0$; for subset $b_1$ the inserted bit is $x^0 = 1$.

The chosen TCM code exhibits no rotational symmetries under ±90° and 180° carrier-phase shifts. Received sequences must be decoded with absolute carrier phase. There is no differential encoding. This choice is based on the consideration that rotational invariance is not needed for burst-mode transmission. (Note that absence of rotational invariance can be considered as an advantage rather than a disadvantage also for applications requiring continuous transmission. Because received symbol sequences are valid TCM sequences only for one carrier phase, absolute carrier phase can be recovered. Differential encoding/decoding is not needed, and bit-error multiplication by differential decoding is avoided.)

The initial state of the TCM encoder SHALL be the zero state. The zero state SHALL be reached again with the last encoded symbol.

To return to the zero state from all possible Trellis paths, if m = 1 (QPSK) three tail symbols ($n_t$ = 3) SHALL be generated with input bit $x^1$ set to $x^1 = s^1$. By inspection of Figure 4-28, after three symbols the state bits $s^2$, $s^1$, and $s^0 = x^0$ will be zero. Tail symbols are extra symbols, which carry no information.

If m ≥ 2, two last symbols must be considered. The input bits $x^2 x^1$ SHALL be set for the first symbol to $x^2 = 0$, $x^1 = s^1$, and for the second (final) symbol to $x^2 = s^2$, $x^1 = s^1$. Again, by inspection of Figure 4-28, after these two symbols the state bits $s^2$, $s^1$, and $s^0 = x^0$ will be zero.

If m = 2, two tail symbols are required ($n_t$ = 2). If m ≥ 3, the uncoded bits $x^m,.. x^3$ SHALL be used for information encoding, when this is possible. Otherwise, uncoded bits SHALL be set to zero. The number of tail symbols carrying no information depends on the ending conditions and can vary between zero and two (0 ≤ $n_t$ ≤ 2).

*High-Capacity Physical Layer Specification*  
*Draft 1 Revision 4*  
*IEEE 802.14a*
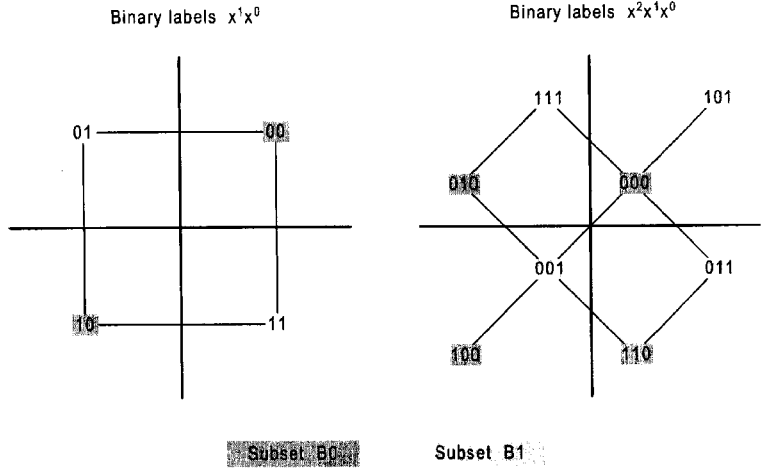
Figure 4-29 QPSK and 8QAM-DS labeling for TCM.
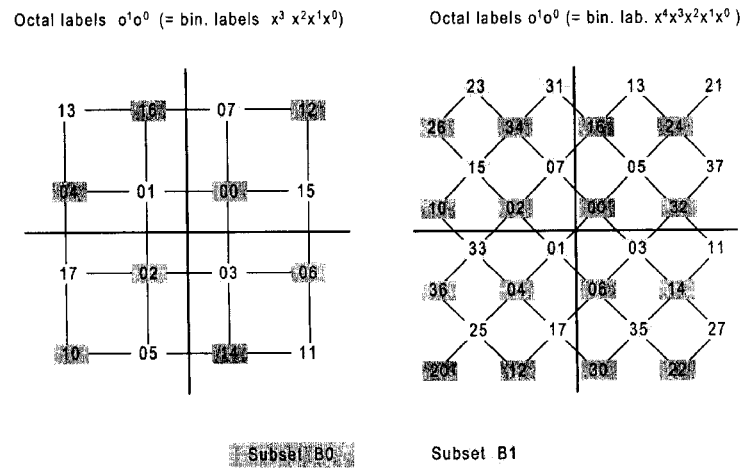
Figure 4-30 16QAM-SQ and 32QAM-DS labeling for TCM

*High-Capacity Physical Layer Specification*  
*Draft 1 Revision 4*

*IEEE 802.14a*

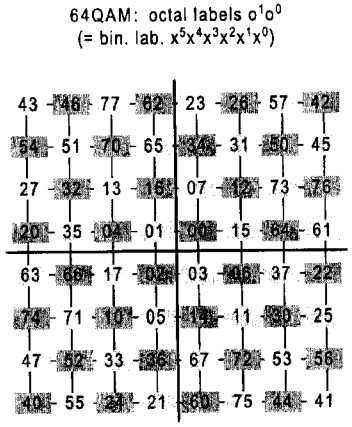

Figure 4-31 64QAM-SQ and 128QAM-DS labeling for TCM

If $m \geq 3$, each of the $N_f$ input bytes is mapped either entirely to uncoded bits $x^m, \ldots x^3$, or entirely to input bits $x^2 x^1$ of the convolutional encoder. The decision is made sequentially for each byte. The rule is that the byte assignment should lead to the shortest packet of symbols including tail symbols, if the current byte were the last byte to be encoded.

Figure 4-32 illustrates the byte assignments for Trellis-coded 64QAM-SQ modulation by two examples. Notice that bytes are assigned in a repetitive pattern of five bytes. In the first example, $N_f$ is divisible by five. In this case two tail symbols are appended. In the second example, $N_f$ is not divisible by five and no tail symbols are required. The bits needed for returning to the zero state are available in symbols still carrying information.

The repetitive patterns of byte assignments to label bits are summarized in Figure 4-33 for $m = 1$ to 6.

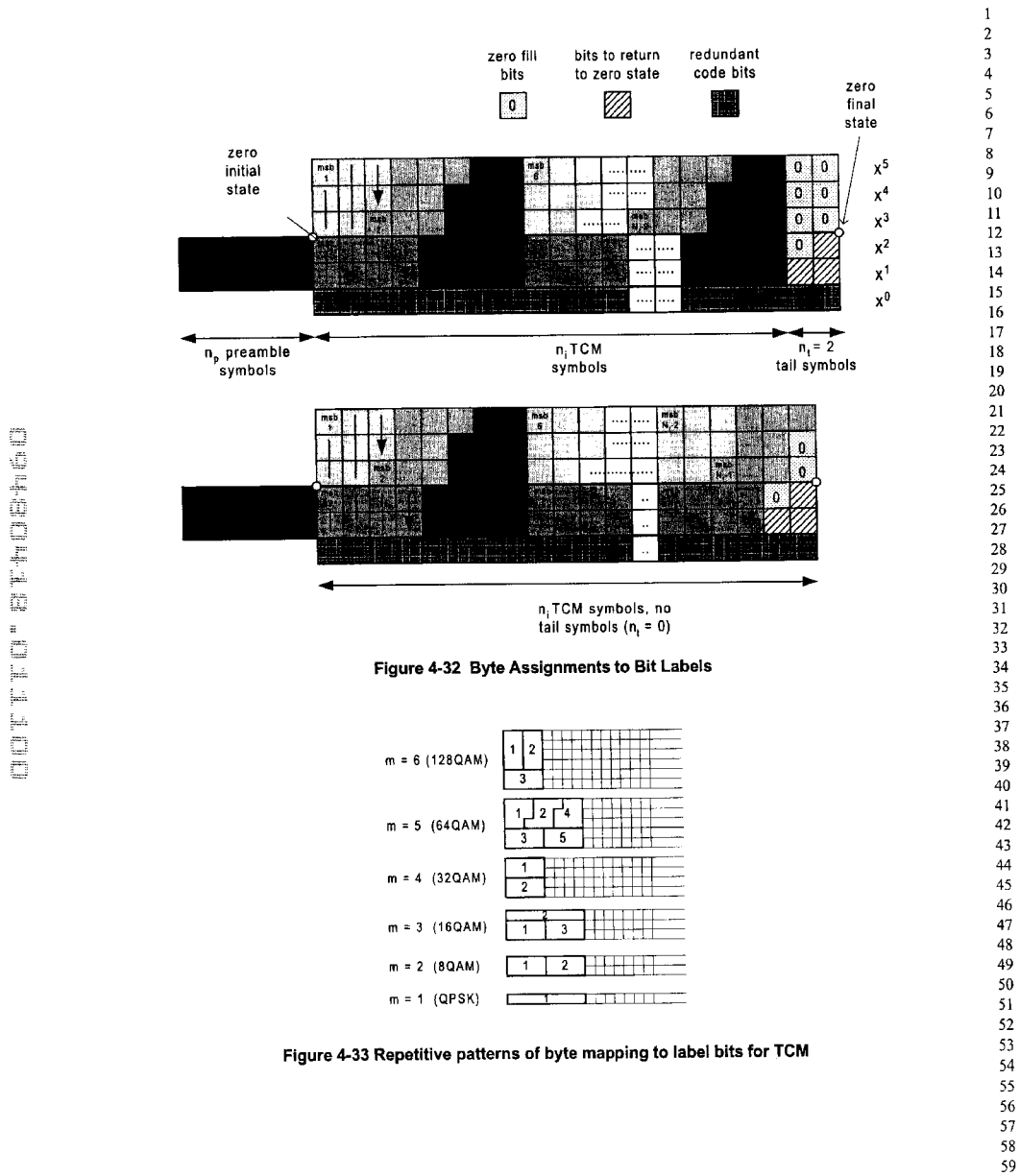
Figure 4-32 Byte Assignments to Bit Labels
Figure 4-33 Repetitive patterns of byte mapping to label bits for TCM

*High-Capacity Physical Layer Specification*  
*Draft 1 Revision 4*

IEEE 802.14a

4.2.10 Inner Interleaving

4.2.10.1 TDMA TCM Coded Subsymbol Interleaver

TCM coded subsymbols SHALL be interleaved after TCM encoding to randomize the burst noise in the channel. Again, this mode can be disabled depending upon the latency requirements and channel characteristics. When the preamble interleaved mode is enabled, the preamble symbols shall be interleaved following the same rule as the TCM coded subsymbols. The block interleaving operation SHALL be employed to do coded subsymbol-by-coded subsymbol interleaving. The two parameters that define the structure of the TCM interleaver are interleaver depth ($I_t$), and group length ($N_t$). The operation of the block interleaving is the same, in principle, as in the R-S byte interleaver case - i.e., filling in one row at a time (1 to $I_t$), and reading out by columns (1 to $N_t$).

$I_t$ should span enough time to cover the channel impulse/burst noise duration, while $N_t$ should be chosen based on the constraint length of the 8-state TCM code (K = 4). In effect, the TCM interleaver spreads the impulse noise of $I_t$ symbol duration over multiple $N_t$ symbol groups ($N_t > K$) such that TCM can operate optimally. When the packet size ($N_p$ symbols as defined in Figure 4-14) is not an integer multiple of $N_t$ symbols, the last group of the packet is made shorter than a full group ($N_t'$), as in the case of shortened last R-S codeword.

The total block size allocated for the interleaver SHALL be 2048 TCM coded subsymbols and both the interleaver depth and block length shall be programmable as shown in Table 4-6.

Table 4-6 TCM Coded Subsymbol Interleaver Parameters

| Parameter | Values |
|---|---|
| Group length ($N_t$) | 1 to 255 |
| Interleaver Depth ($I_t$) | 0* to floor(2048/ $N_t$) |

1  *$I_t$ = 0 denotes dynamically configured $I_t$ value.

As in the R-S block interleaving case, there could be a scenario where the last few TCM coded subsymbols may not be interleaved with enough depth unless the total packet size is related to the TCM block interleaver size ($N_t \times I_t$ symbols).

Figure 4-34 shows an example of the TCM coded subsymbol interleaving process.

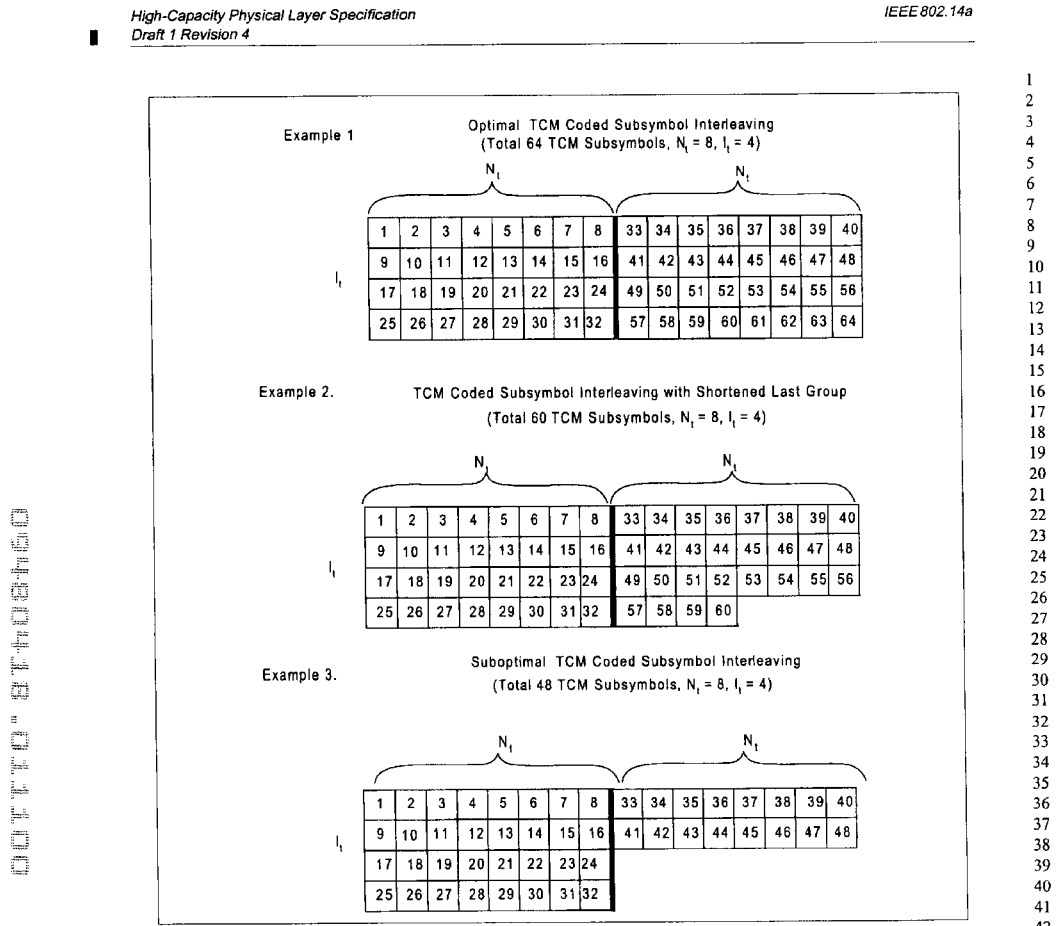

Figure 4-34 TCM Coded Subsymbol Interleaving Example

When $I_t$ is specified as zero, $I_t$ is dynamically configured at the CM. In this case, the total interleaver size ($B_t <= 2048$ coded subsymbols) parameter should also be specified in the burst profile to calculate $I_t$. The choice of $B_t$ directly affects the latency incurred due to the TCM symbol interleaving. $B_t$ is ignored in the fixed $I_t$ mode.

When $I_t = 0$ and the total interleaved symbols $(N_p) <= B_t$ coded subsymbols, $I_t$ is dynamically configured at the CM according to the formula $$I_t = ceil\ (N_p\ /\ N_t) \qquad (EQ\ 35)$$

*High-Capacity Physical Layer Specification*  
*Draft 1 Revision 4*

*IEEE 802.14a* where $N_p$ is the total number of symbols to transmit including data and zero-fill symbols, and including the preamble in the case where the preamble is interleaved, as defined in Figure 4-14. When $N_p$ exceeds $B_t$ symbols, the packet SHALL be interleaved in multiple segments using the following formulas:

Total number of interleaver rows:

$$I_{tot}^o = ceil(N_p/N_t). \qquad (EQ\ 36)$$

Maximal number of rows per segment:

$$I_{t,max} = floor(B_t/N_t). \qquad (EQ\ 37)$$

Number of segments:

$$N_s^o = ceil\left(I_{tot}^o/I_{t,max}\right). \qquad (EQ\ 38)$$

Then for segment m, $I_t^{(m)}$ is calculated as follows ($m = 1...N_s^o$)

$$I_t^{(m)} = ceil\left(I_{tot}^{(m-1)}/N_s^{(m-1)}\right) \qquad (EQ\ 39)$$

$$N_s^{(m)} = N_s^{(m-1)} - 1 \qquad (EQ\ 40)$$

$$I_{tot}^{(m)} = I_{tot}^{(m-1)} - I_t^{(m)} \qquad (EQ\ 41)$$

Example: $N_p = 1100$, $N_t = 16$, $I_t = 0$, $B_t = 1024$;

$$I_{tot}^o = ceil(N_p/N_t) = 69 \qquad (EQ\ 42)$$

$$I_{t,max} = floor(1024/N_t) = 64 \qquad (EQ\ 43)$$

$$N_s^o = ceil\left(I_{tot}^o/I_{t,max}\right) = 2 \qquad (EQ\ 44)$$

For m=1, $$I_t^1 = ceil\left(I_{tot}^0/N_s^0\right) = 35 \qquad (EQ\ 45)$$

$$N_s^1 = N_s^0 - 1 = 1 \qquad (EQ\ 46)$$

$$I_{tot}^1 = I_{tot}^0 - I_t^1 = 34 \qquad (EQ\ 47)$$

Copyright © 1999 IEEE. All rights reserved.  
This is an unapproved IEEE Standards Draft, subject to change.

TI-30301

For m=2 ($N_s^o$), $$I_t^2 = \text{ceil}\left(I_{tot}^1/N_s^1\right) = 34 \quad (EQ\ 48)$$

$$N_s^2 = N_s^1 - 1 = 0 \quad (EQ\ 49)$$

$$I_{tot}^2 = I_{tot}^1 - I_t^2 = 0 \quad (EQ\ 50)$$

In this example, the optimal segmentation has been achieved.

4.2.10.2 S-CDMA TCM Coded Subsymbol Interleaver

In S-CDMA TCM mode, coded subsymbols are interleaved to randomize the burst noise in the channel. The S-CDMA TCM coded subsymbol interleaver is described in Section 4.2.12.1. In S-CDMA, as presented in the frame structure of Figure 4-9, symbols are allocated over codes and spreading intervals. TCM subsymbol interleaving describes the ordering of the subsymbols within a frame, and therefore the description of the framer and interleaver are combined.

4.2.10.3 TDMA BICM Bit Interleaver

In TDMA BICM mode, bits SHALL be interleaved after inner coding.

The bit interleaver operation is similar to the TCM coded subsymbol interleaver (see Section 4.2.10.1). The two parameters that define the structure of the bit interleaver are the interleaver depth ($I_t$), and group length ($N_t$), measured in units of bits. The bits are written serially to the interleaver-matrix line by line (from left to right) and read serially column by column (from top to bottom). When the number of coded bits in the packet is not an integer multiple of $N_t$, the last group of the packet is made shorter than a full group ($N_t'$).

The total block size allocated for the interleaver is 7168 bits. The group length $N_t$ SHALL be programmable in the range 1,..255, and the interleaver depth shall be programmable in the range 0..floor(7168/$N_t$), where as in the case of symbol interleaving $I_t = 0$ denotes dynamically configured $I_t$ value, and where $N_t = 1$ is the case of no bit interleaving. In dynamic $I_t$ mode, total block size is determined by $B_t$ (as in the TCM interleaver). In this case $B_t <= 7186$. $I_t$ is calculated in the same method as the TCM interleaver.

Figure 4-35 shows an example of the bit interleaving process, in the case of a packet of 16 coded bits, $N_t=5$, and 16QAM modulation.

High-Capacity Physical Layer Specification
Draft 1 Revision 4

IEEE 802.14a

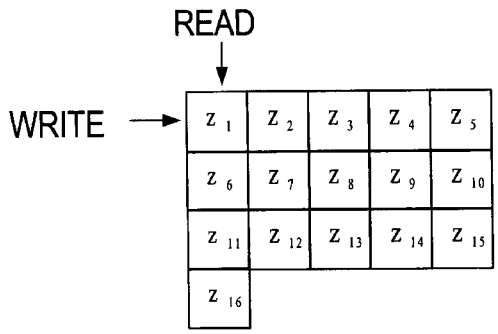

Figure 4-35 Bit Interleaving Example

In this example the first symbol will consist of the bits $z_1, z_6, z_{11}, z_{16}$, the second symbol will consist of $z_2, z_7, z_{12}, z_j$; the third symbol will consist of $z_8, z_{13}, z_4, z_9$; and the last symbol consists of the bits $z_{14}, z_5, z_{10}, z_{15}$.

4.2.10.4 S-CDMA BICM Bit Interleaver

In S-CDMA BICM mode, bits are interleaved to randomize the burst noise in the channel. In S-CDMA, interleaving is performed within the constraints of an S-CDMA frame. Therefore the details of the bit interleaver are described as part of the Framer in Section 4.2.12.1.

4.2.11 Preamble Prepend

The upstream PMD sublayer SHALL support a variable-length preamble field that is prepended to the data after they have been randomized and FEC encoded.

The first bit of the Preamble Pattern is the first bit into the symbol mapper (see Section 4.2.9.2). The first bit of the Preamble Pattern is designated by the Preamble Value Offset as described in Table 6-16, Section 6.3.3.

The total length of the preamble SHALL be up to 1536 bits and its value SHALL be programmable. For IEEE 802.14/DOCSIS 1.0/1.1 CMs, the length SHALL be configured as 0, 2, 4,..., or 1024 bits for QPSK and 0, 4, 8,..., or 1024 bits for 16QAM. For IEEE 802.14a CMs, all preamble symbols SHALL be QPSK with one of two scaling factors (QPSK0 and QPSK1) as shown in Figure 4-19, and thus be configured as 0, 2, 4,..., or 1536 bits (maximum 768 QPSK symbols).

The preamble length and value SHALL be configured in response to the Upstream Channel Descriptor message transmitted by the CMTS. In S-CDMA or synchronous TDMA modes, the preamble symbols can be inserted before the inner interleaver and thus be interleaved with the data. This option is controlled by the burst parameter called *"Preamble Interleaved/Non-interleaved,"* as shown in Table 4-7. When TCM is used, the preamble symbols can be added in one of two modes as defined by the burst profile parameter "Preamble Interleaved/Non-interleaved". In the non-interleaved mode, preamble symbols are added before the data symbols. In the interleaved mode, the preamble symbols may be interleaved within the data symbols following the same rule, defined by $I_t$ and $N_t$, as for the TCM coded subsymbols (see Figure 4-34).

High-Capacity Physical Layer Specification  
Draft 1 Revision 4  
IEEE 802.14a

When BICM is used, the preamble symbols can be added in one of two modes as defined by the burst profile parameter "Preamble Interleaved/Non-interleaved". In the non-interleaved mode, preamble symbols are added before the data symbols. In the interleaved mode they are inserted every $v=\text{MIN}\{8, ceil(N_{MESSAGE}/N_{PREAMBLE})\}+1$ symbols starting from the first symbol, where $N_{MESSAGE}$ is the number of encoded data symbols in the burst, and $N_{PREAMBLE}$ is the number of preamble symbols. Preamble symbols are located at locations 0, v, 2v, 3v.... (1st symbol of the packet is at location 0).

For example, if $N_{MESSAGE} = 13$ and $N_{PREAMBLE} = 4$ then $v = 5$ and the burst will be $P_0 D_0 D_1 D_2 D_3 P_1 D_4 D_5 D_6 D_7 P_2 D_8 D_9 D_{10} D_{11} P_3 D_{12}$, where $P_n$ and $D_n$ denote the preamble and the data symbols respectively.

4.2.12 S-CDMA Blocks

Referring to the block diagram of Figure 4-4, the two blocks which have functionality specific to S-CDMA are the Framer and Interleaver and the Spreader. In conjunction with providing an interleaving function, the Framer groups symbols into spreading intervals within S-CDMA frames. The Framer is described further in Section 4.2.12.1. The Spreader applies a direct sequence spread spectrum code to the framed and mapped data and is described in Section 4.2.12.2. Each of these two S-CDMA blocks have configurable parameters which are set through the use of the UCD message.

4.2.12.1 S-CDMA Framer and Interleaver

The S-CDMA Framer and Interleaver maps mini-slots to codes and spreading intervals by arranging them as bits and symbols within an S-CDMA frame. Interleaving is accomplished by dispersing either coded subsymbols (for TCM) or bits (for BICM) across spreading intervals within a frame.

The S-CDMA framer's function of mapping mini-slots to codes and spreading intervals was illustrated in Section 4.2.3.3.2.1. As previously described, an S-CDMA frame is defined by the number of spreading intervals per frame, codes per mini-slot, and number of active codes. The framer uses this information to map the mini-slots, but it does not work on them one at a time. Instead, the framer maps complete bursts so that any interleaving which is performed is not constrained by individual mini-slot boundaries. Therefore the framer only needs to align bursts to begin and end on mini-slot boundaries. Within a burst, the framer numbers the symbols or bits and allocates them to codes and spreading intervals independent of the mini-slot mapping.

Interleaving is accomplished over symbols for TCM or over bits for BICM. Section 4.2.12.1.1 describes how the framer arranges symbols when TCM is used. Section 4.2.12.1.2 describes how bits are arranged when BICM is used.

*4.2.12.1.1 S-CDMA TCM Coded Subsymbol Interleaving*

*4.2.12.1.1.1 Subframe Definition*

Interleaving is accomplished independently of mini-slots. Instead, interleaving is constrained by subframe boundaries. A subframe is a rectangular subset of an S-CDMA frame over which uncoded subsymbol interleaving is performed. A subframe is generally used to constrain the interleaving region to be of a similar size as the Reed-Solomon codeword to provide protection from impulse noise.

Given an S-CDMA frame which is N codes by K spreading intervals, a subframe is defined to be a group of R contiguous codes, where R is an integer in the frame from 1 to N. A subframe is defined to exist within a single frame and does not span multiple frames. Each burst starts a new subframe and the last subframe within a burst ends with that burst. If needed, the last subframe of a frame is shortened to fit entirely within a single S-CDMA frame, and the last subframe of a burst is also shortened so that the subframe ends with the burst. In both of these High-Capacity Physical Layer Specification  
Draft 1 Revision 4

IEEE 802.14a cases the subframe will be only R' codes instead of R codes where R'≤R. Figure 4-36 shows a subframe consisting of R codes and K symbols within an S-CDMA frame.

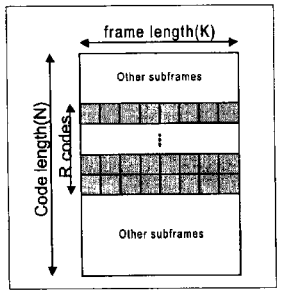

Figure 4-36 Subframe structure

The parameters that define a subframe and the numbering within a subframe are *Codes per Subframe* and *Interleaver Step Size*. These two parameters determine the size of the subframe, and also how the subframe is filled with symbols. The parameter codes per subframe indicates how many codes are in a subframe. The number of symbols in a subframe is then this number of codes multiplied by the number of spreading intervals in a frame. The valid range for the codes per subframe is from 1 to the number of codes in use. The parameter interleaver step size is used while filling in TCM coded subsymbols and the preamble. Both of these types of data fill in subframes first along a row, and this parameter indicates the spreading interval increment to be used while filling in the symbols.

4.2.12.1.1.2 Numbering without TCM Encoding

When the TCM is not used, the symbols within a subframe fill column-wise bottom to top and then left to right. This corresponds to using different codes first and then filling the multiple spreading intervals of the frame. The goal of this symbol numbering is to keep R-S symbols together in time so that impulses will affect fewer R-S symbols. The parameter R should be chosen small enough so that symbols along one or more columns are protected by the R-S encoder. R is set relative to expected burst noise duration and R-S error correction capability. Figure 4-37 below shows how the symbols are numbered for two subframes each with R=3 codes and with a frame length K=8.

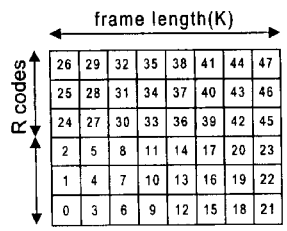

Figure 4-37 Symbol Numbering Without TCM.

54  
Copyright © 1999 IEEE. All rights reserved.  
This is an unapproved IEEE Standards Draft, subject to change.

TI-30301

High-Capacity Physical Layer Specification  
Draft 1 Revision 4

IEEE 802.14a

4.2.12.1.1.3 TCM Numbering

When the TCM is enabled, each transmitted symbol is comprised of a coded and uncoded subsymbol. The coded and the uncoded subsymbols fill the S-CDMA subframe in different orders. Figure 4-38 below shows conceptually the architecture of the framer. The coded subsymbols from the convolutional encoder are placed into a memory using an address generator which causes the data to fill rows first followed by columns. At the same time, the uncoded subsymbols are placed into a memory using an address generator that causes the data to fill columns first followed by rows. The coded subsymbols fill across rows first to prevent error propagation in the decoder due to impulses, while the uncoded subsymbols filled columns first to reduce the number of R-S symbols exposed to impulse events. The use of the address step sizes allows the convolutional encoded subsymbols to be interleaved.

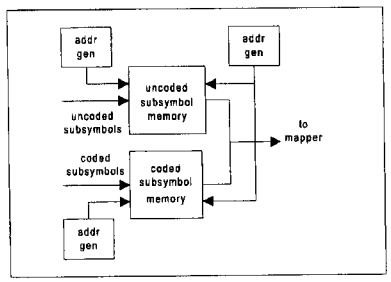

Figure 4-38 Framer detail

The output from the framer uses a single address generator which combines the coded and uncoded subsymbols into a single symbol for the mapper. Figure 4-39 below shows how each symbol within a subframe is composed of a coded subsymbol, $C^i$, and an uncoded subsymbol, $U^i$.

| $U^2$ | $U^5$ | $U^8$ | $U^{11}$ | $U^{14}$ | $U^{17}$ | $U^{20}$ | $U^{23}$ |
|---|---|---|---|---|---|---|---|
| $C^{16}$ | $C^{17}$ | $C^{18}$ | $C^{19}$ | $C^{20}$ | $C^{21}$ | $C^{22}$ | $C^{23}$ |
| $U^1$ | $U^4$ | $U^7$ | $U^{10}$ | $U^{13}$ | $U^{16}$ | $U^{19}$ | $U^{22}$ |
| $C^8$ | $C^9$ | $C^{10}$ | $C^{11}$ | $C^{12}$ | $C^{13}$ | $C^{14}$ | $C^{15}$ |
| $U^0$ | $U^3$ | $U^6$ | $U^9$ | $U^{12}$ | $U^{15}$ | $U^{18}$ | $U^{21}$ |
| $C^0$ | $C^1$ | $C^2$ | $C^3$ | $C^4$ | $C^5$ | $C^6$ | $C^7$ |

Figure 4-39 Coded and uncoded portions of symbols

Listing 1 contains a short algorithmic description of the operation of the address generator for the coded subsymbols. The address generator for the coded subsymbols fills rows first using the interleaver step size parameter (step in the listing) to step through the spreading intervals within a row. Each step is performed using a modified modulo algorithm which allows the use of *interleaver step size* and *spreading intervals per frame* with common divisors. After each row is filled, the next row is begun with the first spreading interval. In the following listings, the index "i" is initialize to the value "1".

Listing 1.  Coded subsymbol numbering

*High-Capacity Physical Layer Specification*  
*Draft 1 Revision 4*

*IEEE 802.14a*

$coded\_col_i = coded\_col_{i-1} + step$ if $(mod(i, framelen/gcd(step, framelen))=0)$ /* gcd is greatest common divisor */

$coded\_col_i = coded\_col_i + 1$ $coded\_col_i = mod(coded\_col_i, framelen)$ if (completed row)

start next row

Listing 2 contains a short algorithmic description of the operation of the address generator for the uncoded subsymbols. The address generator for the uncoded subsymbols fills columns within a subframe first. The row index increments by one for each uncoded subsymbol, and each time the end of the subframe is reached, the column index is incremented and the row index is set to the first row of the subframe. After completing a subframe, the next subframe will begin with the next uncoded subsymbol.

Listing 2.    Uncoded subsymbol numbering $uncoded\_row_i = uncoded\_row_{i-1} + 1$ if $(mod(i, R)=0)$ $uncoded\_row_i = uncoded\_row_i - R$ $uncoded\_col_i = uncoded\_col_i + 1$ Listing 3 contains a short algorithmic description of the operation of the address generator for the output symbols. The address generator for the output symbols is used to access both the coded and uncoded subsymbol memories. The output address generator accesses all of the rows(codes) of a spreading interval first followed by subsequent spreading intervals.

Listing 3.    Framer output numbering $outrow_i = outrow_{i-1} + 1$ if $(outrow_i > codelen)$ next spreading interval

4.2.12.1.1.4 Preamble

The preamble symbols use the same numbering as the coded subsymbols of symbols so that the preamble is afforded protection against impulse bursts. The preamble fills in symbols within a code first (row-wise) and uses subsequent codes only after using all available symbols in previous codes. Preamble symbols only contain preamble data meaning that all bits of a preamble symbol behave like coded subsymbols. Figure 4-40 and Figure 4-41 show the numbering of a subframe which contains a preamble of length 4. In the figures, the locations with the designations $P^0$, $P^1$, $P^2$, and $P^3$ are used to hold the preamble symbols, and the data symbols fill all of the other locations.

TI-30301

High-Capacity Physical Layer Specification  
Draft 1 Revision 4

IEEE 802.14a

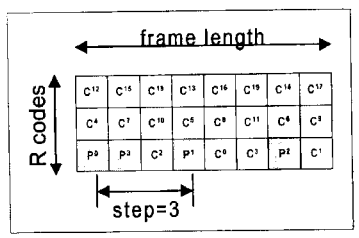

Figure 4-40 Coded subsymbols with preamble

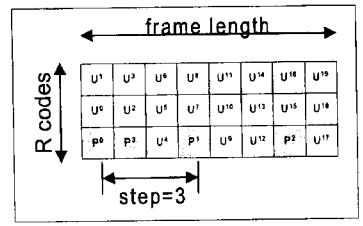

Figure 4-41 Uncoded subsymbols with preamble

4.2.12.1.1.5 Shortened Subframes

The last subframe of a frame or of a burst may be smaller than the typical subframe of R codes. In these cases, the subframe will be created using R'≤R codes and the symbols will be filled using the smaller number of codes. Shortened subframes are used to prevent subframes from spanning multiple bursts and to prevent subframes from spanning multiple frames both of which are prohibited. The symbol numbering for the coded subsymbols will remain the same, but the uncoded subsymbols will fill R' rows instead of R rows.

4.2.12.1.2 S-CDMA BICM Bit Interleaving

When BICM is used, bits are interleaved instead of symbols. In S-CDMA mode, bit interleaving is accomplished as part of the framer. The framer arranges bits into symbols and then symbols into S-CDMA frames. As previously described, an S-CDMA frame is given by the number of active codes by K spreading intervals. Bit interleaving is accomplished over bits within a frame, and thus over three dimensions: time (spreading intervals), codes and bits. This section further describes the details of this bit interleaving function.

A single parameter, *interleaver step size* (in bits), controls the bit interleaver. The step size is similar to $I_t$, the depth of the bit interleaver in TDMA mode. For S-CDMA, the step size is programmable over the range from 1 to 32.

Figure 4-42 illustrates the functionality of the BICM bit interleaver with an example. This example shows the bit ordering for 8QAM, an interleaver step size of three, and a burst which spans three codes by seven spreading intervals. The first bit of the burst, $z_1$, is placed in the bit 0 location of code n at spreading interval 1. The second bit, $z_2$, is then placed at bit 0, code n, but with spreading interval 1 + interleaver step size. Subsequent bits are filled in along rows according to the modified modulo algorithm which was described in Section 4.2.12.1.1.3, Copyright © 1999 IEEE. All rights reserved.  
This is an unapproved IEEE Standards Draft, subject to change.

TI-30301

*High-Capacity Physical Layer Specification*  
*Draft 1 Revision 4*  
*IEEE 802.14a*

Listing 1 for TCM coded subsymbol interleaving. According to this modified modulo algorithm, the next 5 bits are filled in row bit0 of spreading code n in spreading intervals 7, 3, 6, 2 and 5 respectively. After filling in 3 rows (k rows for $2^k$QAM modulation) with 21 bits begins the filling of bit0 row of spreading code n+1. The bit interleaving and framing process continues until row bit2 of spreading code n+2 is filled in.

| | | 1 | 2 | 3 | 4 | 5 | 6 | 7 |
|---|---|---|---|---|---|---|---|---|
| | bit 7 | 0 | 0 | 0 | 0 | 0 | 0 | 0 |
| | | 0 | 0 | 0 | 0 | 0 | 0 | 0 |
| | | 0 | 0 | 0 | 0 | 0 | 0 | 0 |
| code n+2 | | 0 | 0 | 0 | 0 | 0 | 0 | 0 |
| | | 0 | 0 | 0 | 0 | 0 | 0 | 0 |
| | bit 2 | $Z_{57}$ | $Z_{62}$ | $Z_{60}$ | $Z_{58}$ | $Z_{63}$ | $Z_{61}$ | $Z_{59}$ |
| | bit 1 | $Z_{50}$ | $Z_{55}$ | $Z_{53}$ | $Z_{51}$ | $Z_{56}$ | $Z_{54}$ | $Z_{52}$ |
| | bit 0 | $Z_{43}$ | $Z_{48}$ | $Z_{46}$ | $Z_{44}$ | $Z_{49}$ | $Z_{47}$ | $Z_{45}$ |
| | bit 7 | 0 | 0 | 0 | 0 | 0 | 0 | 0 |
| | | 0 | 0 | 0 | 0 | 0 | 0 | 0 |
| | | 0 | 0 | 0 | 0 | 0 | 0 | 0 |
| code n+1 | | 0 | 0 | 0 | 0 | 0 | 0 | 0 |
| | | 0 | 0 | 0 | 0 | 0 | 0 | 0 |
| | bit 2 | $Z_{36}$ | $Z_{41}$ | $Z_{39}$ | $Z_{37}$ | $Z_{42}$ | $Z_{40}$ | $Z_{38}$ |
| | bit 1 | $Z_{29}$ | $Z_{34}$ | $Z_{32}$ | $Z_{30}$ | $Z_{35}$ | $Z_{33}$ | $Z_{31}$ |
| | bit 0 | $Z_{22}$ | $Z_{27}$ | $Z_{25}$ | $Z_{23}$ | $Z_{28}$ | $Z_{26}$ | $Z_{24}$ |
| | bit 7 | 0 | 0 | 0 | 0 | 0 | 0 | 0 |
| | | 0 | 0 | 0 | 0 | 0 | 0 | 0 |
| | | 0 | 0 | 0 | 0 | 0 | 0 | 0 |
| code n | | 0 | 0 | 0 | 0 | 0 | 0 | 0 |
| | | 0 | 0 | 0 | 0 | 0 | 0 | 0 |
| | bit 2 | $Z_{15}$ | $Z_{20}$ | $Z_{18}$ | $Z_{16}$ | $Z_{21}$ | $Z_{19}$ | $Z_{17}$ |
| | bit 1 | $Z_{8}$ | $Z_{13}$ | $Z_{11}$ | $Z_{9}$ | $Z_{14}$ | $Z_{12}$ | $Z_{10}$ |
| | bit 0 | $Z_{1}$ | $Z_{6}$ | $Z_{4}$ | $Z_{2}$ | $Z_{7}$ | $Z_{5}$ | $Z_{3}$ | spreading intervals

Figure 4-42 Bit Interleaver and Framer for S-CDMA BICM

When preamble symbols are present, the preamble symbols fill complete symbols according to the interleaver step size and a code increment. The use of the interleaver step provides time diversity for the preamble symbols and code increment reduces the impact of the preamble on individual codes. After filling in the preamble, bit interleaving is performed over the remaining symbols in the frame.

4.2.12.2 S-CDMA Spreader

The basis of signal transmission with S-CDMA is direct-sequence spread-spectrum coding. S-CDMA employs a family of orthogonal digital code words, called spreading codes, to simultaneously transmit 128 modulation symbols. In each spreading interval, a vector, $\overline{P}_k$, is transmitted such that:

$$\overline{P}_k = \overline{S}_k * C, \qquad (EQ\ 51)$$

where $\overline{S}_k$ is a vector, $[s_{k,127}, s_{k,126}, \ldots, s_{k,0}]$, of modulation symbols to be transmitted in spreading interval $k$, and $C$ is a matrix,

*High-Capacity Physical Layer Specification*  
*Draft 1 Revision 4*  
*IEEE 802.14a*

$$C = \begin{bmatrix} c_{127,127} & c_{127,126} & \cdots & c_{127,0} \\ c_{126,127} & c_{126,126} & \cdots & c_{126,0} \\ \cdots & \cdots & \cdots & \cdots \\ c_{0,127} & c_{0,126} & \cdots & c_{0,0} \end{bmatrix} \quad (EQ\ 52)$$

where the rows of $C$ are the 128 spreading codes such that Code(j) = $[c_{j,127}, c_{j,126}, ..., c_{j,0}]$. The result of the spreading operation is the transmission vector $\overline{P}_k$ which has 128 elements, $[p_{k,127}, p_{k,126}, ..., p_{k,0}]$, where each element is transmitted at the signaling rate, with element $p_{k,0}$ transmitted first in time.

The set of orthogonal codes used for the spreading operation is quasi-cyclic and consists of values which are either +1 or -1. Code(0) consists of 128 elements all of which have value of +1. For Code(1), each element corresponding to the following set of indices is equal to -1:

{0 2 3 4 5 6 7 9 10 11 13 16 17 18 19 20 21 25 26 28 30 31 33 34 35 37 39 40 41 49 51 52 55 56 59 60 61 65 66 67 69 72 73 74 77 78 79 81 84 90 92 94 97 100 101 103 106 109 110 111 114 117 119 121};

The remaining elements of Code(1) have a value of +1.

Each Code(j) is obtained by cyclic shift to the left (in the direction of increasing indices) of Code(j-1) where the element, $c_{j,0}$, has a value of -1 and does not take part in the cyclic shift.

It is important to note that if a CM has not been assigned to use a particular code, $j$, at a spreading time interval, $k$, then in its computation of its transmission vector $\overline{P}_k$, it will set $s_{k,j}$ to zero. The assignment of codes to the CM is performed by the framer as it assigns a burst of symbols a particular order in the two-dimensional space of codes and time. This symbol sequencing was described in detail in Section 4.2.12.1.

As Code(0) consists of all +1 values, this code does not have the same spreading properties as the other codes. As a consequence, under certain channel noise conditions, it may suffer a performance degradation relative to the other codes.

*4.2.12.2.1 Code Hopping*

Code hopping refers to a systematic re-ordering of the rows of the spreading matrix, C (presented in Section 4.2.12.2), at each spreading interval. The code-hopping algorithm uses a pseudo-random number to determine a cyclic shift of the rows of the matrix C as shown in Figure 4-43. When the number of active codes equals 128, the code hopping algorithm uses all codes. When the number of active codes is less than or equal to 127, then the code hopping algorithm hops only over the cyclic codes (Code0, the all 1s code, is excluded).

In S-CDMA mode, code-hopping SHALL be used.

Note that when the number of active codes < 128, the unused codes are those at the bottom of the matrix starting with matrix index 0. In this case, the code hopping offset continues to "hop" over all of the codes except for Code0, even if the number of active codes is less than 127. For example, suppose that the number of active codes is 126. Then in the example shown on the right of Figure 4-43, with an offset of 59 as shown, the two unused codes are Code 0 and Code 70. With any offset value, code 0 will be unused, the other unused code will be the code occupying index 1 of the matrix (Code[128 - offset + 1]).

59

Copyright © 1999 IEEE. All rights reserved.  
This is an unapproved IEEE Standards Draft, subject to change.

TI-30301

High-Capacity Physical Layer Specification  
Draft 1 Revision 4

IEEE 802.14a

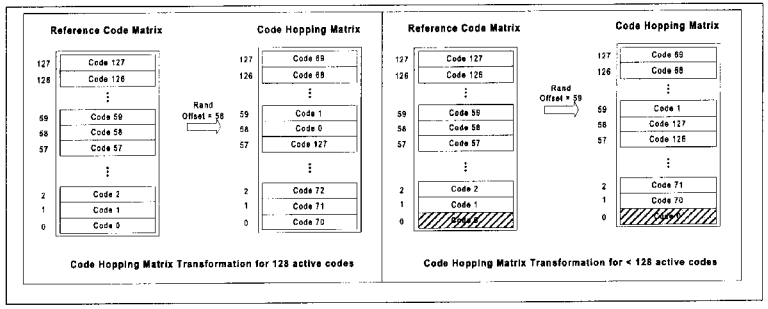

Figure 4-43 Code Hopping Matrix Transformation

The pseudo-random number generator which determines the code hopping offset value is the linear-feedback shift register (LFSR) which is shown in Figure 4-44. In order to align the CM's code-hopping offset sequence with that at the CMTS, the LFSR is reset when the frame counter rolls over to zero. (The description of the frame counter and the procedures for its synchronization are described in Section 4.2.3.3.7, mini-slot and Frame Synchronization). At this reset, a 15-bit initialization value (seed) is loaded into the shift register and is used at the first spreading interval. Then at each subsequent spreading interval, a new bit is shifted into the LFSR producing a new 7-bit value. This value is converted into the code hopping offset value by a modulo operation. For the case where the number of active codes < 128, the offset is computed modulo(127) + 1; otherwise, it is modulo(128).

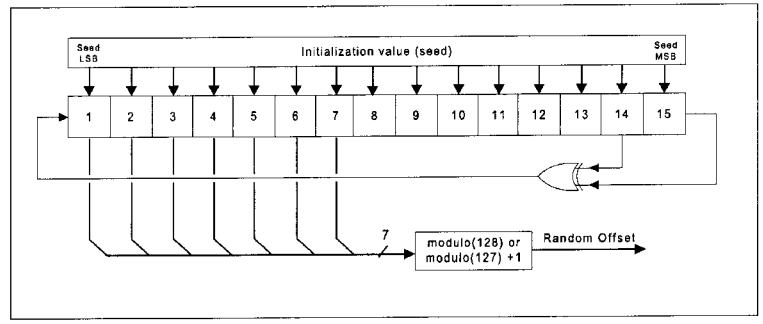

Figure 4-44 Code Hopping Random Number Generator

The 15-bit seed value is configured in response to the Upstream Channel Descriptor message from the CMTS. The low seven bits of the LFSR are input to the modulo block, with bit 7 as the MSB. The output of the modulo block is the random offset value (depicted by the example in Figure 4-44).

High-Capacity Physical Layer Specification  
Draft 1 Revision 4

IEEE 802.14a

4.2.13 Transmit Pre-equalizer

*NOTE: A number of issues with respect to the transmit pre-equalizer have not been resolved. In particular, the DOCSIS 1.1 ECN has not been addressed nor the substantial number of comments in the document ballot_decisions4.doc.*

A symbol-spaced transmit pre-equalizer with 8 feedforward taps and 16 feedback taps, as shown in Figure 4-45, SHALL be configured in response to the Upstream Channel Descriptor message transmitted by the CMTS. The MAC message has 16 bits per coefficient in fractional two's complement notation. However, the CM only needs to implement to 12 bits minimum, by truncating the 4 LSBs - "s.11" (sign bit, binary point, and 11 fractional bits) for feedforward coefficients, and "s1.10" (sign bit, integer bit, binary point, and 10 fractional bits) for feedback coefficients.

The CMTS SHALL compute and send the feedforward and feedback coefficients according to the precision specified above. These coefficients are assumed to be loaded directly to the transmit pre-equalizer by the CM without further modification. The feedback-tap coefficients SHALL have the polarity according to the convention used in Figure 4-45. The CMTS SHALL normalize the pre-equalizer coefficients to guarantee proper operation such as not to overflow or clip. The pre-equalizer feedforward coefficients *(Fi)* SHALL be normalized such that $$\sum_{i=0}^{7} (|F^{real}_i| + |F^{imag}_i|) \leq 1 \quad (EQ\ 53)$$

when the modulo operation is enabled, or $$\sum_{i} (|H^{real}_i| + |H^{imag}_i|) \leq 1 \quad (EQ\ 54)$$

when the modulo operation is disabled entirely or in any part of the packet (i.e., during the preamble). Here, H(z) refers to the overall response of the pre-equalizer including the feedback section.

If the modulo operation is enabled, the feedback equalizer/precoder block functions as a precoder; if the modulo operation is disabled, this block functions as a linear feedback equalizer. In S-CDMA mode, the modulo operation SHALL be disabled. The modulo value (M) for all constellation formats is 32 according to the integer notation used in the constellation diagrams (Figure 4-19). As indicated by the burst parameters in Table 4-7, the modulo operation for the preamble and data portions can be enabled/disabled independently.

Before any ranging (either initial maintenance or periodic station maintenance), all coefficients of the transmit pre-equalizer should be initialized to zero except the real coefficient of the last tap (F7_real = 1.0) of the feedforward equalizer in IEEE 802.14a. In the case where a linear pre-equalizer is the default setting (such as in DOCSIS 1.0), the real coefficient of the center tap ($F^{real}_i$, where i = floor[tap_size/2] -1) should be set to 1.0. The pre-equalizer coefficients are then updated though the ranging process. The coefficient normalization reduces the transmitted power of the CM. The CM delta power command (part of the RNG_RSP message) accompanying the new coefficient set can thus be used to re-adjust the CM output power if the CMTS desires.

Sufficient zero symbols, at least 16 symbols to cover the span of the feedback filter, should follow each data burst so as to ensure the signal level tails off to -36 dB or less. One way to achieve this is to add zero symbols after the last data symbol directly to the feedforward filter bypassing the feedback section, as shown in Figure 4-45. All the internal registers of the pre-equalizer SHALL be cleared before each burst transmission with an exception of back-to-back bursts.

Copyright © 1999 IEEE. All rights reserved.  
This is an unapproved IEEE Standards Draft, subject to change.

*High-Capacity Physical Layer Specification*  
*Draft 1 Revision 4*

*IEEE 802.14a*

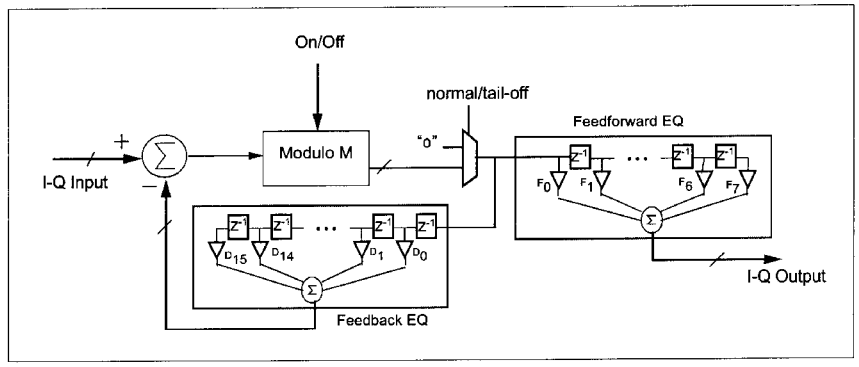

Figure 4-45 Transmit Pre-equalizer Structure

4.2.14 Upstream Frequency Agility and Range

The upstream PMD sublayer SHALL support operation over the frequency range of 5-42 MHz edge to edge.

Offset (fine) frequency resolution SHALL be supported having a range of ±32 kHz (increment = 1 Hz; implement within ±10 Hz). The fine frequency command is defined as a change from the last position. For example, a fine frequency command of 100 Hz means that the CM should increase its current transmit carrier frequency by 100 Hz, and this should result in a change of 90 - 110 Hz. Course frequency accuracy (accuracy without the use of the fine frequency command) is addressed in Section 4.2.19.5.2.

4.2.15 Spectrum Convention

The upstream modulator SHALL provide operation with the format $s(t) = I(t)*\cos(wt) - Q(t)*\sin(wt)$, where $s(t)$ is the transmitted RF waveform, $I(t)$ and $Q(t)$ are the I- and Q-channel waveforms corresponding to the specified transmit constellation, t denotes time and w denotes angular frequency.

4.2.16 Burst Profiles

The transmission characteristics are separated into three portions: a) Channel Parameters, b) Burst Profile Attributes, and c) User Unique Parameters. The Channel Parameters include i) the symbol rate (six rates from 160 ksym/sec to 5.12 Msym/sec in octave steps), ii) the center frequency (Hz), and iii) the 1536-bit Preamble Superstring, and iv) the S-CDMA mode (enable/disable). The Channel Parameters are further described in Section 6.3.2.2 Table 6-14; these characteristics are shared by all users on a given channel.

The Burst Profile Attributes are listed in Table 4-7, and are further described in Section 6.3.2.2 Table 6-15; these parameters are the shared attributes corresponding to a burst type.

The User Unique Parameters may vary for each user even when using the same burst type on the same channel as another user (for example, Power Level), and are listed in Table 4-8.

The CM SHALL generate each burst at the appropriate time as conveyed in the mini-slot grants provided by the CMTS MAPs (Section 6.3.3).

*High-Capacity Physical Layer Specification*  
*Draft 1 Revision 4*  
IEEE 802.14a The CM SHALL support all burst profiles commanded by the CMTS via the Burst Descriptors in the UCD (Section 6.3.2.2), and subsequently assigned for transmission in a MAP (Section 6.3.3).

A burst length of 0 mini-slots in the Burst Profile means that the burst length is variable on that channel for that burst type. The burst length is granted by the CMTS to the CM in the MAP.

Table 4-7 Burst Profile Attributes

| Burst Profile Attributes | Configuration Settings |
|---|---|
| Modulation | QPSK, 8QAM, 16 QAM, 32QAM, 64QAM, 128QAM |
| Diff Encoding | On/Off (only for QPSK and 16QAM, no TCM) |
| Preamble Length | 0-1536 bits (Note Section 4.2.11) |
| Preamble Value offset | 0 to 1534 |
| Preamble Type | QPSK0/QPSK1 |
| R-S FEC Error Correction (T bytes) | 0 to 10 (0 implies R-S FEC = off) |
| R-S FEC Codeword Information Bytes (k) | Fixed: 16 to 253 (assuming R-S FEC on) Shortened: 16 to 253 (assuming FEC on) |
| R-S Last Codeword Length | Fixed, shortened |
| Scrambler Seed | 15 bits |
| Maximum Burst Length (mini-slots) | 0 to 255 |
| Guard Time | 5 to 255 symbols (DOCSIS 1.0/1.1) |
|  | 1 to 255 symbols (IEEE 802.14a) |
| Scrambler On/Off | On/Off |
| Inner Coding Scheme | No Inner Coding, TCM, BICM |
| BICM Puncturing Mode | 1/2, 2/3, 3/4, 5/6 (code rate) |
| R-S Interleave Depth (Ir)[1] | 0 to floor(2048/Nr) (1 implies R-S interleaver off) |
| R-S Interleave Total Block Size (Br)[2] | 18 to 2048 (in bytes) |
| TDMA Inner Interleave Group Length (Nt) | 1 to 255 (Note Section 4.2.10) |
| TDMA Inner Interleave Depth (It)[1] | 0 to floor (2048/Nt) (1 implies TCM inner interleaver off) - Coded subsymbols in TCM mode |
|  | 0 to floor (7168/Nt) - Bits in BICM mode |
| Inner Interleave Total Block Size (Bt)[2] | 1 to 2048 (in coded subsymbols in TCM mode) |
|  | 1 to 7168 (in bits in BICM mode) |
| Preamble Interleaved/Non-interleaved[3] | Interleaved/Non-interleaved |
| TH Precoder modulo enable for data | On/Off |
| TH Precoder modulo enable for preamble | On/Off |
| S-CDMA Codes per Subframe | 1 - 128 |
| S-CDMA Interleaver Step Size | 1 - 32 (in coded subsymbols in TCM mode, in bits in BICM mode) |

1. Note: If depth =1, no interleaving; if depth = 0, dynamic mode.
2. Note: Used only in the dynamically-configured interleaver depth mode.
3. Note: For TCM modes, if preamble is interleaved, the preamble insertion position is before the inner interleaver. Otherwise, it is after the inner interleaver.

Copyright © 1999 IEEE. All rights reserved.  
This is an unapproved IEEE Standards Draft, subject to change.

High-Capacity Physical Layer Specification  
Draft 1 Revision 4

IEEE 802.14a

Table 4-8 User Unique Burst Parameters

| User Unique Parameter | Configuration Settings |
|---|---|
| Power Level[1] | +8 to +54 dBmV (TDMA, 128QAM) |
| | +8 to +54 dBmV (TDMA, 64QAM) |
| | +8 to +55 dBmV (TDMA, 32QAM) |
| | +8 to +55 dBmV (TDMA, 16QAM) |
| | +8 to +56 dBmV (TDMA, 8QAM) |
| | +8 to +58 dBmV (TDMA, QPSK) |
| | +8 to +58 dBmV (S-CDMA, QPSK, 8-, 16-, 32-, 64-, and 128-QAM) |
| | 1-dB steps or less |
| Power Back-off Factor | Back-off factor from the maximum power level when transmit pre-equalizer is enabled (in dB) |
| Offset Frequency | Range = +/-32 kHz, in 1 Hz steps |
| Ranging Offset | Integer part: signed 32-bit, units of 6.25 μsec/64 |
| | Fractional part: unsigned 8-bit fractional extension, units of 6.25 μsec/(64*256) |
| Burst Length (mini-slots) if variable on this channel (changes burst-to-burst) | 1 to 255 mini-slots |
| Transmit Equalizer Coefficients (IEEE 802.14a) | 24 coefficients; 4 bytes per coefficient: 2 real and 2 imaginary |

[1] Values in table apply (for any given channel and symbol rate) when transmit pre-equalizer is not active.

Ranging Offset is the delay correction applied by the CM to the CMTS Upstream Frame Time derived at the CM, in order to synchronize the upstream transmissions in the TDMA or TDMA/S-CDMA scheme. The Ranging Offset is an advancement equal to roughly the round-trip delay of the CM from the CMTS. The CMTS SHALL provide feedback correction for this offset to the CM, based on reception of one or more successfully received bursts (i.e., satisfactory result from each technique employed: error correction and/or CRC), with resolution of 1/16384 of the frame tick increment (6.25 μsec/16384 = 0.384 nsec). The CMTS sends adjustments to the CM, where a negative value implies the Ranging Offset is to be decreased, resulting in later times of transmission at the CM. For DOCSIS 1.0/1.1 mode, the CM burst timing accuracy is relative to the mini-slot boundaries derivable at the CM based on an ideal processing of the timestamp signals received from the CMTS. For IEEE 802.14a mode, the CM burst timing accuracy is referenced to the downstream symbol clock.

In S-CDMA mode, an additional ranging accuracy is required. For S-CDMA, the CM SHALL implement a ranging offset correction with an accuracy of at most ±1/64 of a signaling symbol clock period (of the symbol clock in use).

4.2.17 Reconfiguration Time Between Consecutive Burst Transmissions

The CM SHALL be capable of switching burst profiles with no reconfiguration time required between bursts except for changes in the following parameters: 1) Output Power, 2) Modulation, 3) Symbol Rate, 4) Offset Frequency, 5) Channel Frequency, and 6) Ranging Offset.

For Symbol Rate, Offset frequency and Ranging Offset, the CM SHALL be able to transmit consecutive bursts as long as the CMTS allocates at least 96 symbols in between the last symbol center of one burst and the first symbol center of the following burst, EXCLUDING the latency due to all the interleaving delays. The reconfiguration time of 96 symbols should compensate for the ramp down time of one burst and the ramp up time of the next burst as well as the overall transmitter delay time including the pipeline delay and pre-equalizer delay. For modulation type changes, the CM SHALL be able to transmit consecutive bursts as long as the CMTS

*High-Capacity Physical Layer Specification*  
*Draft 1 Revision 4*  
*IEEE 802.14a* allocates at least 96 symbols in between the last symbol center of one burst and the first symbol center of the following burst. Output Power, Symbol Rate, Offset frequency, Channel Frequency and Ranging Offset SHALL NOT be changed until the CM is provided sufficient time between bursts by the CMTS. Transmitted Output Power, Symbol Rate, Offset frequency, Channel Frequency and Ranging Offset SHALL NOT change while more than -36dB of any symbol's energy of the previous burst remains to be transmitted, or more than -36dB of any symbol's energy of the next burst has been transmitted. The modulation SHALL NOT change while more than -36dB of any symbol's energy of the previous burst remains to be transmitted, or more than -36dB of any symbol's energy of the next burst has been transmitted, EXCLUDING the effect of the transmit equalizer (if present in the CM). [This is to be verified with the transmit equalizer providing no filtering; delay only. Note that if the CMTS has decision feedback in its equalizer, it may need to provide more than the 96 symbol gap between bursts of different modulation type which the same CM may use; this is a CMTS decision.] Negative ranging offset adjustments will cause the 96 symbol guard to be violated. The CMTS must assure that this does not happen by allowing extra guard time between bursts that is at least equal to the amount of negative ranging offset.

If Channel Frequency is to be changed, then the CM SHALL be able to implement the change between bursts as long as the CMTS allocates at least 96 symbols plus 100 msec between the last symbol center of one burst and the first symbol of the following burst.

The Channel Frequency of the CM SHALL be settled within the phase noise and accuracy requirements of Section 4.2.19.5 within 100 msec from the beginning of the change.

If Output Power is to be changed by 1 dB or less, the CM SHALL be able to implement the change between bursts as long as the CMTS allocates at least 96 symbols plus 5 μsec between the last symbol center of one burst and the first symbol center of the following burst.

If Output Power is to be changed by more than 1 dB, the CM SHALL be able to implement the change between bursts as long as the CMTS allocates at least 96 symbols plus 10 μsec between the last symbol center of one burst and the first symbol center of the following burst.

The Output Power of the CM SHALL be settled to within +/- 0.1 dB of its final output power level a) within 5 μsec from the beginning of a change of 1 dB or less, and b) within 10 μsec from the beginning of a change of greater than 1 dB.

In S-CDMA mode, for changes in Output Power, Symbol Rate, Offset Frequency, Channel Frequency, Pre-equalizer coefficients, and/or Ranging Offset, the CM SHALL be able to transmit consecutive bursts as long as the CMTS allocates the time duration of at least one frame in between the bursts. For all other burst profile parameter changes, no reconfiguration time is required.

The output transmit power SHALL be maintained constant within a TDMA burst to within less than 0.1 dB (excluding the amount theoretically present due to pulse shaping, and any amplitude modulation).

4.2.18 Transmit Power Requirements

The upstream PMD sublayer SHALL support varying the amount of transmit power. Requirements are presented for 1) the range of commanded transmit power, 2) the step size of the power commands, and 3) the accuracy (actual output power compared to the commanded amount) of the response to the command.

The mechanism by which power adjustments are performed is defined in Section 8.2.5 of this document. Such adjustments SHALL be within the ranges of tolerances described below.

Copyright © 1999 IEEE. All rights reserved.  
This is an unapproved IEEE Standards Draft, subject to change.

TI-30301

High-Capacity Physical Layer Specification  
Draft 1 Revision 4

IEEE 802.14a

4.2.18.1 Output Power Agility and Range

In TDMA mode, the output transmit power in the design bandwidth SHALL be variable over the range of +8 dBmV to 54 dBmV (128QAM and 64QAM), 55 dBmV (32QAM and 16 QAM), 56 dBmV (8QAM) or 58 dBmV (QPSK), in 1-dB steps.

For S-CDMA mode, the output transmit power in the design bandwidth SHALL be variable over the range of +8 dBmV to 58 dBmV (128QAM, 64QAM, 32QAM, 16QAM, 8QAM, QPSK) in 1-dB steps.

The absolute accuracy of the transmitted power SHALL be ± 2dB, and the step size accuracy ± 0.4dB, with an allowance for hysteresis while switching in/out a step attenuator (e.g. 20 dB), in which case the accuracy requirement is relaxed to ± 1.4 dB. For example, the actual power increase resulting from a command to increase the power level by 1dB in a CM's next transmitted burst SHALL be between 0.6 and 1.4dB.

The step resolution SHALL be 1dB or less. When a CM is commanded with finer resolution than it can implement, it SHALL round to the nearest supported step size. If the commanded step is half way between two supported step sizes, the CM SHALL choose the smaller step. For example, with a supported step resolution of 1 dB, a command to step ± 0.5 dB would result in no step, while a command to step ± 0.75 dB would result in a ± 1 dB step.

Table 4-9 shows output power levels for S-CDMA for several cases involving various numbers of active and allocated codes. Note that a CM's output power may vary by as much as 18 dB within a burst depending on the mapping of a burst across S-CDMA frames.

Table 4-9 Example Output Power Levels for S-CDMA

| Number of Active Codes | Number of allocated codes | Min. Output Power (dBmV) | Max Output Power (dBmV) | Min. Output Power/Code (dBmV) | Max Output Power/Code (dBmV) |
|---|---|---|---|---|---|
| 128 | 2 | 8 | 40 | 5 | 37 |
| 128 | 128 | 26 | 58 | 5 | 37 |
| 64 | 2 | 8 | 43 | 5 | 40 |
| 64 | 64 | 23 | 58 | 5 | 40 |
| 16 | 2 | 8 | 49 | 5 | 46 |
| 16 | 16 | 17 | 58 | 5 | 46 |
| 2 | 2 | 8 | 58 | 5 | 55 |

4.2.19 Fidelity Requirements

4.2.19.1 Modulation Error Ratio

Modulation error ratio (MER) is defined as the ratio of the average power of the ideal constellation to the mean squared error in the transmitted constellation, where the error is referenced to the ideal constellation. MER includes the effects of thermal noise, phase noise, in-band spurious, ISI, and all other in-band transmitter degradations.

MER should be measured on a QAM test receiver (such as an HP89441A) using a square-root raised-cosine receive filter with $\alpha_{sf}$ = 0.25. The test receiver has an adaptive 24-tap symbol-spaced FIR equalizer which may be enabled or disabled. The test receiver selects the gain, carrier frequency, carrier phase, and symbol timing phase to maximize the MER, and holds these parameters fixed over each captured block of signal samples. In S-

*High-Capacity Physical Layer Specification*  
*Draft 1 Revision 4*  
*IEEE 802.14a*

CDMA mode, despreading is performed prior to the MER measurement, with the despreading code phase selected to maximize the MER.

In the case where CM transmit pre-equalization is on, the IIR coefficients may be set to zero and the FIR coefficients of the pre-equalizer are selected to maximize the MER.

4.2.19.1.1 Self Interference

MER requirements SHALL be met over the full range of carrier frequencies and power levels. In S-CDMA mode, the MER requirements SHALL also be met independently on each individual code, in the presence of any or all other codes, over the full range of allowed code allocations and assignments.

The MER SHALL meet the following limits:

With transmit pre-equalization OFF and test receive equalization OFF, MER >= 27 dB.

With transmit pre-equalization OFF and test receive equalization ON, MER >= 34.5 dB.

With transmit pre-equalization ON and test receive equalization OFF, MER >= 34.5 dB.

4.2.19.1.2 Self Interference and Other Modem Interference (S-CDMA mode)

For two S-CDMA transmitters with transmit pre-equalization ON and test receive equalization OFF, the following requirements SHALL be met over the full range of carrier frequencies and power levels:

a. Transmitter 1 sending any 2 codes, and transmitter 2 sending the remaining 126 codes:

Each of the received codes from transmitter 1 SHALL be received with MER >= 34.5 dB.

b. Transmitter 1 sending any 126 codes, and transmitter 2 sending the remaining 2 codes:

Each of the received codes from transmitter 1 SHALL be received with MER >= 34.5 dB.

Adjacent code interference measurements SHALL be met over all of the following two conditions: (1) each S-CDMA transmitter SHALL be adjusted for equal output power per transmitted code, (2) each S-CDMA transmitter SHALL be synchronized in such a way to maximize the MER (minimize errors).

*NOTE: Adjacent code interference measurements for S-CDMA should be performed over a variety of test scenarios including non-equal power and non-ideal timing variations. These test scenarios should be the subject of further study.*

4.2.19.2 Spurious Emissions

These noise and spurious emissions requirements SHALL be met over the output power ranges of section 4.2.17.1. All spurious emissions measurements SHALL be made at the "F" connection of the CM, unless otherwise noted. In S-CDMA mode, the spurious emissions requirements SHALL be met over any number of allocated codes over the specified ranges of power.

TI-30301

*High-Capacity Physical Layer Specification*  
*Draft 1 Revision 4*

*IEEE 802.14a*

4.2.19.2.1 Adjacent Channels

Adjacent channel spurious emissions SHALL meet the limits in Table 4-10. The measurements are performed separately on both sides of the transmitted carrier and for each symbol rate of the carrier under test. The carrier edge is defined as the (1 + alpha) bandwidth.

Table 4-10 Spurious Emissions in Adjacent Channels

| Limit (one side of carrier) | Measured Band from Carrier Edge |
|---|---|
| -46 dBc | 20 KHz to 180 KHz |
| -46 dBc | 40 KHz to 360 KHz |
| -46 dBc | 80 KHz to 720 KHz |
| -46 dBc | 160 KHz to 1440 KHz |
| -46 dBc | 320 KHz to 2880 KHz |
| -44 dBc | 640 KHz to 5760 KHz |

4.2.19.2.2 Non-Adjacent Channels

Spurious emissions are specified in bands corresponding to the possible symbol rates of non-adjacent carriers in the 5 to 42 MHz band, independent of the symbol rate of the carrier under test. A series of measurements is specified which start at the edge of the desired signal and are repeated by sliding the measurement band away from the carrier until the upstream band edge, 5 MHz or 42 MHz, is reached. The carrier frequency of the desired signal can be anywhere in the 5 to 42 MHz range.

The spurious emissions SHALL meet the limits given in Table 4-11 The table lists the required spurious emissions level in each band and the initial point at which to begin the measurement. The limit applies separately to each side of the transmitted carrier.

4.2.19.2.2.1 Carrier-Related Exclusion Bands

For each possible symbol rate of the interfering carrier, three or fewer carrier-related bands (such as 2nd harmonic), each of width 160 kHz, may be excluded from the measurements. The power in each excluded band SHALL be less than or equal to -53 dBc for transmitted symbol rates of 320 ksps and above, and less than or equal to -50 dBc for a transmitted symbol rate of 160 ksps.

TI-30301

Table 4-11 Spurious Emissions in Non-Adjacent Channels

| Limit (one side of carrier) | Initial Measurement Band from Carrier Edge |
|---|---|
| -56 dBc | 220 KHz to 380 KHz |
| -54 dBc | 240 KHz to 560 KHz |
| -52 dBc | 280 KHz to 920 KHz |
| -50 dBc | 360 KHz to 1640 KHz |
| -47 dBc | 520 KHz to 3080 KHz |
| -44 dBc | 840 KHz to 5960 KHz |

*4.2.19.2.3 Burst On/Off Transients*

The transmitter SHALL control spurious emissions, prior to and during ramp-up and during and following ramp-down, before and after a transmit burst. This requirement does not apply to transients during powering on or off of the CM equipment.

On/off spurious emissions, such as the change in voltage at the transmitter output due to enabling or disabling transmission, SHALL be no more than 100 mV into 75 ohms, and such a step SHALL be dissipated no faster than 2 μsec constant slewing. This requirement applies when the CM is transmitting at +55 dBmV or more; at backed-off transmit levels, the maximum change in voltage SHALL decrease by a factor of 2 for each 6-dB decrease of power level from +55 dBmV, down to a maximum change of 7 mV at 31 dBmV and below.

*4.2.19.2.4 Transmit Power Limit Between Bursts*

The transmitter output power between bursts SHALL be less than or equal to -72 dBc or -59 dBmV, whichever is greater, measured in any 160 KHz bandwidth in the 5–42 MHz band.

By definition, the transmitted burst time interval includes the mini-slots granted to the CM (when the CM uses all or a portion of the grant), plus a mini-slot before and after the granted mini-slots. Note that a mini-slot may be as short as 32 symbols, which is 6.25 microseconds at the 5.12 Msym/sec rate or 200 microseconds at the 160 ksym/sec rate.

*4.2.19.2.5 Spurious Emissions in Downstream Band from Upstream Transmitter*

CM spurious emissions in the downstream band SHALL be within the limits in Table 4-12. An exclusion is given for a single discrete spur related to the tuned received channel; this spur SHALL be no greater than -40 dBmV. The notation "dBd" denotes decibels relative to the average downstream carrier level, with the F connector of the CM as the reference point.

*High-Capacity Physical Layer Specification*  
*Draft 1 Revision 4*

*IEEE 802.14a*

Table 4-12 Spurious Emissions in Downstream Band from Upstream Transmitter

| Parameter | Transmitting Burst | Between Bursts |
|---|---|---|
| CM Integrated Spurious Emissions Limits (in 4 MHz BW, includes discretes) 42 to 54 MHz 54 to 60 MHz 60 to 88 MHz 88 to 860 MHz | max(-40 dBd*, -26 dBmV) -35 dBmV -40 dBmV -45 dBmV | -26 dBmV -40 dBmV -40 dBmV max(-40 dBd*, -45 dBmV) |
| CM Discrete Spurious Emissions Limits 42 to 54 MHz 54 to 88 MHz 88 to 860 MHz | -max(-50 dBd*, -36 dBmV) -50 dBmV -50 dBmV | -36 dBmV -50 dBmV -50 dBmV |

1   dBd is relative to the downstream carrier level and *max(x,y)* means which of *x* and *y* has the higher power level.

4.2.19.3 Spectral Mask

The following requirements assume that any pre-equalization is disabled.

The spectral mask SHALL be the ideal square root raised cosine spectrum with $\alpha_{sf} = 0.25$, within the ranges given below:

fc - $R_s$/4 Hz to fc + $R_s$/4 Hz: -0.3 dB to +0.3 dB fc - 3$R_s$/8 Hz to fc - $R_s$/4 Hz, and fc + $R_s$/4 Hz to fc + 3$R_s$/8 Hz: -0.5 dB to 0.3 dB fc - $R_s$/2 Hz and fc + $R_s$/2 Hz: -3.5 dB to -2.5 dB fc - 5$R_s$/8 Hz and fc + 5$R_s$/8 Hz: no greater than -30 dB where fc is the center frequency, $R_s$ is the symbol rate, and the spectral density is measured with a resolution bandwidth of 10 KHz or less.

The specifications for group delay variation SHALL be in accordance with the MER specifications of Section 4.2.19.1.

4.2.19.4 Occupied Bandwidth

The occupied spectrum bandwidths are shown in Table 4-13. The channel width is defined as the 30-dB bandwidth.

TI-30301

High-Capacity Physical Layer Specification  
Draft 1 Revision 4

IEEE 802.14a

Table 4-13 Occupied Bandwidth

| Symbol Rate (ksym/sec) | Channel Width (kHz) |
|---|---|
| 160 | 200 |
| 320 | 400 |
| 640 | 800 |
| 1,280 | 1,600 |
| 2,560 | 3,200 |
| 5,120 | 6,400 |

4.2.19.5 Carrier and Clock Quality

*4.2.19.5.1 Carrier Phase Noise*

The transmitter integrated phase noise (including discrete spurious emissions noise) SHALL be less than or equal to -46 dBc summed over the spectral regions spanning 1 kHz to 400 kHz above and below the carrier.

The transmitter integrated phase noise (including discrete spurious emissions noise) SHALL be less than or equal to -46 dBc summed over the spectral regions spanning 8 kHz to 3.2 MHz above and below the carrier.

*4.2.19.5.2 Channel Frequency Accuracy*

Without application of fine frequency offset, the following requirements SHALL be met:

In TDMA mode, the CM SHALL implement the assigned upstream channel frequency within +/-50 parts per million over the operating temperature range up to five years from date of manufacture.

In S-CDMA mode, the CM SHALL implement the assigned upstream channel frequency within +/-5 parts per million relative to the downstream symbol rate.

*4.2.19.5.3 Symbol Rate Accuracy*

For TDMA mode, the CM SHALL implement the assigned upstream symbol rate within +/- 50 parts per million over the operating temperature range up to 5 years from date of manufacture.

For S-CDMA mode, The CM SHALL lock the upstream symbol rate to the downstream symbol rate, subject to the symbol timing jitter requirements of Section 4.2.19.5.4.

*4.2.19.5.4 Symbol Timing Jitter*

For TDMA mode, peak-to-peak symbol jitter, referenced to the previous symbol zero-crossing, of the transmitted waveform, SHALL be less than 0.01 of the nominal symbol duration over a 2-sec period. In other words, the difference between the maximum and the minimum symbol duration during the 2-sec period shall be less than 0.01 of the nominal symbol duration for each of the five upstream symbol rates.

Also for TDMA mode, the peak-to-peak cumulative phase error, referenced to the first symbol time and with any fixed symbol frequency offset factored out, SHALL be less than 0.02 of the nominal symbol duration over a 0.1-sec period. In other words, the difference between the maximum and the minimum cumulative phase error during the 0.1 sec period shall be less than 0.02 of the nominal symbol duration for each of the five upstream symbol

*High-Capacity Physical Layer Specification*  
*Draft 1 Revision 4*

*IEEE 802.14a* rates. Factoring out a fixed symbol frequency offset to be done by using the computed mean symbol duration during the 0.1 sec.

For S-CDMA, peak symbol clock phase error (relative to the CMTS master clock) SHALL be less than 1% of the symbol period over a 30 second measurement interval.

4.2.20 Upstream RF Output Characteristics

The CM SHALL output an RF modulated signal with the characteristics delineated in Table 4-14.

For S-CDMA mode, only symbol rates of 1280 ksym/sec and above are used, and the level range specification applies when all codes are simultaneously transmitted by the CM. When fewer codes are transmitted, the level will be proportionally reduced.

Table 4-14 Electrical Output from CM

| Parameter | Value |
|---|---|
| Frequency | 5 to 42 MHz edge to edge |
| Level Range (One Channel) | See Table 4-8 (User Unique Burst Parameters) Power Level. |
| Modulation Type | QPSK, 8 through 128QAM |
| Symbol Rate | 160, 320, 640, 1280, 2560 and 5120 ksym/sec |
| Bandwidth | 200, 400, 800, 1600, 3200 and 6400 kHz |
| Output Impedance | 75 ohms |
| Output Return Loss | > 6 dB (5-42 MHz) |
| Connector | F connector per [IPS-SP-406] (common with the input) |

4.2.21 Upstream Demodulator Input Power

The maximum total input power to the upstream demodulator SHALL NOT exceed 35 dBmV average power in the 5-42 MHz frequency band.

The intended received power in each carrier SHALL at a minimum be within the values shown in Table 4-15.

For S-CDMA mode, only symbol rates of 1280 ksym/sec and above are used, and the power specification applies when all codes are simultaneously received. When fewer codes are received, the level will be proportionally reduced.

High-Capacity Physical Layer Specification  
Draft 1 Revision 4  
IEEE 802.14a

Table 4-15 Maximum Range of Commanded Nominal Receive Power Per Upstream Carrier

| Symbol Rate (ksym/sec) | Maximum Range (dBmV) |
|---|---|
| 160 | -16 to +14 |
| 320 | -13 to +17 |
| 640 | -10 to +20 |
| 1280 | -7 to +23 |
| 2560 | -4 to +26 |
| 5120 | -1 to +29 |

Table 4-15 specifies for each symbol rate a 30 dB range of expected power levels. For any expected receive level in these specified ranges, the CMTS receiver must operate within its defined performance specifications if the actual receive power is within +/- 6 dB.

4.3 Downstream

4.3.1 Downstream Protocol

The downstream PMD sublayer SHALL conform to ITU-T Recommendations J.83, Annex B for Low-Delay Video Applications [ITU J.83-B], with the exceptions called out in Section 4.3.2.

4.3.2 Scalable Interleaving to Support Low Latency

The downstream PMD sublayer SHALL support a variable-depth interleaver with the characteristics defined in Table 4-16. The table contains a subset of interleaver modes found in [ITU J.83-B].

Table 4-16 Interleaver Characteristics

| I (Number of Taps) | J (Increment) | Burst Protection 64QAM/256QAM | Latency 64QAM/256QAM |
|---|---|---|---|
| 8 | 16 | 5.9 µsec/4.1 µsec | 0.22 msec/0.15 msec |
| 16 | 8 | 12 µsec/8.2 µsec | 0.48 msec/0.33 msec |
| 32 | 4 | 24 µsec/16 µsec | 0.98 msec/0.68 msec |
| 64 | 2 | 47 µsec/33 µsec | 2.0 msec/1.4 msec |
| 128 | 1 | 95 µsec/66 µsec | 4.0 msec/2.8 msec |

The interleaver depth, which is coded in a 4-bit control word contained in the FEC frame synchronization trailer, always reflects the interleaving in the immediately-following frame. In addition, errors are allowed while the interleaver memory is flushed after a change in interleaving is indicated.

Refer to [ITU J.83-B] for the control bit specifications required to specify which interleaving mode is used.

4.3.3 Downstream Frequency Plan

The downstream frequency plan should comply with Harmonic Related Carrier (HRC), Incremental Related Carrier (IRC) or Standard (STD) North American frequency plans per [IS-6]. However, operation below a center frequency of 91 MHz is not required.

Copyright © 1999 IEEE. All rights reserved.  
This is an unapproved IEEE Standards Draft, subject to change.

TI-30301

*High-Capacity Physical Layer Specification*  *IEEE 802.14a*
*Draft 1 Revision 4*

4.3.4 CMTS Output Electrical

The CMTS SHALL output an RF modulated signal with the following characteristics defined in Table 4-17.

Table 4-17 CMTS Output

| Parameter | Value |
|---|---|
| Center Frequency (fc) | 91 to 857 MHz ±30 kHz[a] |
| Level | Adjustable over the range 50 to 61 dBmV |
| Modulation Type | 64QAM and 256QAM |
| Symbol Rate (nominal) | |
| 64QAM | 5.056941 Msym/sec |
| 256QAM | 5.360537 Msym/sec |
| Nominal Channel Spacing | 6 MHz |
| Frequency response | |
| 64QAM | ~18% Square Root Raised Cosine shaping |
| 256QAM | ~12% Square Root Raised Cosine shaping |
| Total Discrete Spurious Emissions Inband (fc ± 3 MHz) | < -57dBc |
| Inband Spurious Emissions and Noise (fc ± 3 MHz) | < -48dBc; where channel spurious emissions and noise includes all discrete spurious emissions, noise, carrier leakage, clock lines, synthesizer products, and other undesired transmitter products. Noise within +/- 50kHz of the carrier is excluded. |
| Adjacent channel (fc ± 3.0 MHz) to (fc ± 3.75 MHz) | < -58 dBc in 750 kHz |
| Adjacent channel (fc ± 3.75 MHz) to (fc ± 9 MHz) | < -62 dBc, in 5.25 MHz, excluding up to 3 spurs, each of which must be <-60 dBc when measured in a 10 kHz band |
| Next adjacent channel (fc ± 9 MHz) to (fc ± 15 MHz) | Less than the greater of -65 dBc or -12dBmV in 6MHz, excluding up to three discrete spurs. The total power in the spurs must be < -60dBc when each is measured with 10 kHz bandwidth. |
| Other channels (47 MHz to 1,000 MHz) | < -12dBmV in each 6 MHz channel, excluding up to three discrete spurs. The total power in the spurs must be < -60dBc when each is measured with 10kHz bandwidth. |
| Phase Noise | 1 kHz - 10 kHz: -33dBc double sided noise power |
| | 10 kHz - 50 kHz: -51dBc double sided noise power |
| | 50 kHz - 3 MHz: -51dBc double sided noise power |
| Output Impedance | 75 ohms |
| Output Return Loss | > 14 dB within an output channel up to 750 MHz; > 13 dB in an output channel above 750 MHz |
| Connector | F connector per [IPS-SP-406] |

1 ±30 kHz includes an allowance of 25 kHz for the largest FCC frequency offset normally built into upconverters.
2 The CMTS emissions into the upstream band need to be specified.

4.3.5 Downstream Electrical Input to CM

The CM SHALL accept an RF modulated signal with the following characteristics (Table 4-18.)

High-Capacity Physical Layer Specification  
Draft 1 Revision 4

IEEE 802.14a

Table 4-18 Electrical Input to CM

| Parameter | Value |
|---|---|
| Center Frequency | 91 to 857 MHz ±30 kHz |
| Level Range (one channel) | -15 dBmV to +15 dBmV |
| Modulation Type | 64QAM and 256QAM |
| Symbol Rate (nominal) | 5.056941 Msym/sec (64QAM) and 5.360537 Msym/sec (256QAM) |
| Bandwidth | 6 MHz (18% Square Root Raised Cosine shaping for 64QAM and 12% Square Root Raised Cosine shaping for 256QAM) |
| Total Input Power (40-900 MHz) | <30 dBmV |
| Input (load) Impedance | 75 ohms |
| Input Return Loss | > 6 dB (88-860 MHz) |
| Connector | F connector per [IPS-SP-406] (common with the output) |

4.3.6 CM BER Performance

The bit-error-rate performance of a CM SHALL be as described in this section. The requirements apply to the $I = 128$, $J = 1$ mode of interleaving.

4.3.6.1 64QAM

4.3.6.1.1 64QAM CM BER Performance

Implementation loss of the CM SHALL be such that the CM achieves a post-FEC BER less than or equal to $10^{-8}$ when operating at a carrier to noise ratio ($E_s/N_o$) of 23.5 dB or greater.

4.3.6.1.2 64QAM Image Rejection Performance

Performance as described in Section 4.3.6.1.1 SHALL be met with analog or digital signal at +10 dBc in any portion of the RF band other than the adjacent channels.

4.3.6.1.3 64QAM Adjacent Channel Performance

Performance as described in Section 4.3.6.1.1 SHALL be met with digital signal at 0 dBc in the adjacent channels.

Performance as described in Section 4.3.6.1.1 SHALL be met with analog signal at +10 dBc in the adjacent channels.

Performance as described in Section 4.3.6.1.1, with an additional 0.2-dB allowance, SHALL be met with digital signal at +10 dBc in the adjacent channels.

4.3.6.2 256QAM

4.3.6.2.1 256QAM CM BER Performance

Implementation loss of the CM SHALL be such that the CM achieves a post-FEC BER less than or equal to $10^{-8}$ when operating at a carrier to noise ratio (Es/No) as shown below.

Copyright © 1999 IEEE. All rights reserved.  
This is an unapproved IEEE Standards Draft, subject to change.

TI-30301

*High-Capacity Physical Layer Specification*  
*Draft 1 Revision 4*

*IEEE 802.14a*

Input Receive Signal LevelEs/No

-6 dBmV to +15dBmV30dB or greater

Less than -6dBmV down to -15dBmV33dB or greater

4.3.6.2.2  256QAM Image Rejection Performance

Performance as described in Section 4.3.6.2.1 SHALL be met with analog or digital signal at +10 dBc in any portion of the RF band other than the adjacent channels.

4.3.6.2.3  256QAM Adjacent Channel Performance

Performance as described in Section 4.3.6.2.1 SHALL be met with analog or digital signal at 0 dBc in the adjacent channels.

Performance as described in Section 4.3.6.2.1, with an additional 0.5-dB allowance, SHALL be met with analog signal at +10 dBc in the adjacent channels.

Performance as described in Section 4.3.6.2.1, with an additional 1.0-dB allowance, SHALL be met with digital signal at +10 dBc in the adjacent channels.

4.3.7  CMTS Timestamp Jitter

The CMTS timestamp jitter must be less than 500 ns peak-to-peak at the output of the Downstream Transmission Convergence Sublayer. This jitter is relative to an ideal Downstream Transmission Convergence Sublayer that transfers the MPEG packet data to the Downstream Physical Media Dependent Sublayer with a perfectly continuous and smooth clock at the MPEG packet data rate. Downstream Physical Media Dependent Sublayer processing SHALL NOT be considered in timestamp generation and transfer to the Downstream Physical Media Dependent Sublayer.

Thus, any two timestamps N1 and N2 (N2 > N1) which were transferred to the Downstream Physical Media Dependent Sublayer at times T1 and T2 respectively must satisfy the following relationship:

$$| (N2 - N1)/(10240000 \text{ Hz}) - (T2 - T1) | < 500 \text{ nsec}$$

The jitter includes inaccuracy in timestamp value and the jitter in all clocks. The 500 ns allocated for jitter at the Downstream Transmission Convergence Sublayer output must be reduced by any jitter that is introduced by the Downstream Physical Media Dependent Sublayer.

The CM is expected to meet the burst timing accuracy requirements in Section 4.2.16 when the time stamps contain this worst-case jitter.

Note: Jitter is the error (i.e., measured) relative to the CMTS Master Clock. (The CMTS Master Clock is the 10.24 MHz clock used for generating the timestamps.)

The CMTS 10.24 MHz Master Clock SHALL have frequency stability of <=4 ppm, drift rate <=$10^{-8}$ per second, and edge jitter of <= 10 nsec peak-to-peak (+/-5 nsec). [The drift rate and jitter requirements on the CMTS Master Clock implies that the duration of two adjacent segments of 10,240,000 cycles will be within 30 nsec, due to 10 nsec jitter on each segments' duration, and 10 nsec due to frequency drift. Durations of other counter lengths also may be deduced: adjacent 1,024,000 segments, <= 21 nsec; 1,024,000 length segments separated by 1 10,240,000 cycles, <= 30 nsec; adjacent 102,400,000 segments, <= 120 nsec. The CMTS Master Clock SHALL meet such test limits in 99% or more measurements.]

High-Capacity Physical Layer Specification  
Draft 1 Revision 4

IEEE 802.14a

4.3.8 CMTS Clock Generation

The CMTS has the following three options related to the synchronization of the CMTS Master Clock and the Downstream Symbol Clock (the options are configured through the Channel TLV Parameter, Sync mode, of the UCD message):

1. Not locked (Sync mode = 1).

2. Downstream Symbol Clock locked to CMTS Master Clock (Sync mode = 2)

3. CMTS Master Clock locked to Downstream Symbol Clock (Sync mode = 3)

Let $f_b'$ represent the rate of the Downstream Symbol Clock which is locked to the CMTS Master Clock and let $f_m'$ represent the rate of the CMTS Master Clock locked to the Downstream Symbol Clock. Let $f_b$ represent the nominal specified downstream symbol rate and let $f_m$ represent the nominal CMTS Master Clock rate (10.24 MHz).

With the Downstream Symbol Clock locked to the CMTS Master Clock the following equation SHALL hold:

$$f_b' = f_m * M/N \qquad (EQ\ 55)$$

With the CMTS Master Clock locked to the Downstream Symbol Clock the following equation SHALL hold:

$$f_m' = f_b * N/M \qquad (EQ\ 56)$$

M and N SHALL be unsigned integer values each representable in 16 bits. (These are specified in the channel TLV parameters of the UCD). When the Downstream Symbol Clock and the CMTS Master Clock are not locked together (Sync mode = 0), the values of M and N are not valid and are ignored by the CM.

The values of M and N SHALL result in a value of $f_b'$ or $f_m'$ which is not more than +/-1 ppm from its specified nominal value. Table 4-19 lists the downstream modes of operation, their associated nominal symbol rates, $f_b$, example values for M and N, the resulting synchronized clock rates, and their offsets from their nominal values.

Table 4-19 Downstream symbol rates and example parameters for synchronization with the CMTS Master Clock.

| Downstream mode | Nominal Specified Symbol Rate, fb (MHz) | M/N | CMTS Master Clock Rate, fm' (MHz) | Downstream Symbol Rate, fb' (MHz) | Offset from Nominal |
|---|---|---|---|---|---|
| Annex B, 64QAM | 5.056941 | 401/812 | 10.239990... | 5.056945... | 0.95 ppm |
| Annex B, 256QAM | 5.360537 | 78/149 | 10.240000... | 5.360536... | 0.02 ppm |
| Annex A, 64QAM and 256QAM (8 MHz) | 6.952 | 869/1280 | 10.24 | 6.952 | 0 ppm |
| Annex C, 64QAM and 256QAM (6 MHz) | 5.304 | 663/1280 | 10.24 | 5.304 | 0 ppm |

1  Until the CM receives its first UCD message, the CM SHALL use the appropriate values of M and N as specified in Table 4-

Copyright © 1999 IEEE. All rights reserved.  
This is an unapproved IEEE Standards Draft, subject to change.

TI-30301

*High-Capacity Physical Layer Specification*
*Draft 1 Revision 4*

*IEEE 802.14a*

19.

What is claimed is:

1. A bit-interleaved encoder for a CATV upstream channel, comprising:
   a convolutional encoder for receiving data values, the convolutional encoder including a puncturing unit;
   a bit-interleaver interconnected with said encoder, said bit interleaver having a width that is not an integer multiple of a puncturing cycle of said puncturing unit; and
   a symbol mapper interconnected with said bit-interleaver.

2. The encoder of claim 1, wherein said bit-interleaver has a depth not an integer multiple of a bits per symbol for said channel.

3. The encoder of claim 1, wherein said symbol mapper is a QPSK or QAM mapper.

* * * * *